United States Patent
Brady et al.

(10) Patent No.: US 9,338,126 B2
(45) Date of Patent: May 10, 2016

(54) SYSTEM AND METHOD FOR COMMUNICATING IN A TELECOMMUNICATION NETWORK VIA INDEPENDENT KEY ROUTING AND DATA LOCALITY TABLES

(71) Applicant: OPENET TELECOM LTD., Dublin (IE)

(72) Inventors: Thomas Brady, Dublin (IE); Craig Ferguson, Kildare (IE); Peter Haraszti, Dublin (IE); Cameron Ross Dunne, Kildare (IE); Alan McNamee, Dublin (IE)

(73) Assignee: OPENET TELECOM LTD., Dublin (IE)

( * ) Notice: Subject to any disclaimer, the term of this patent is extended or adjusted under 35 U.S.C. 154(b) by 229 days.

(21) Appl. No.: 13/903,769

(22) Filed: May 28, 2013

(65) Prior Publication Data

US 2013/0325985 A1 Dec. 5, 2013

Related U.S. Application Data

(60) Provisional application No. 61/652,731, filed on May 29, 2012.

(51) Int. Cl.
*H04L 12/58* (2006.01)
*H04L 29/08* (2006.01)
*H04L 29/06* (2006.01)

(52) U.S. Cl.
CPC .......... *H04L 51/38* (2013.01); *H04L 65/1016* (2013.01); *H04L 65/1069* (2013.01);
(Continued)

(58) Field of Classification Search
USPC ........................................................ 709/206
See application file for complete search history.

(56) References Cited

U.S. PATENT DOCUMENTS

| | | | |
|---|---|---|---|
| 2002/0176581 A1* | 11/2002 | Bilgic et al. | 380/270 |
| 2004/0264465 A1* | 12/2004 | Dunk | 370/392 |
| 2008/0256020 A1* | 10/2008 | Wakefield | 707/1 |
| 2010/0299451 A1 | 11/2010 | Yigang et al. | |
| 2011/0165901 A1* | 7/2011 | Baniel et al. | 455/500 |

FOREIGN PATENT DOCUMENTS

WO 2009058067 A1 5/2009

OTHER PUBLICATIONS

European Search Report, EP Application No. 13169821, Dec. 9, 2013.

(Continued)

*Primary Examiner* — Kristie Shingles
*Assistant Examiner* — Mohammad Yousuf A Mian
(74) *Attorney, Agent, or Firm* — The Marbury Law Group, PLLC

(57) ABSTRACT

A combination of an independent key routing (IKR) method and a data locality table (DLT) method may be used to route communication messages in a telecommunication network to achieve improved data locality and reduce secondary key lookups. A processor a multiprocessor computing system may receive a first communication message that includes subscriber identifiers that uniquely identify a subscriber, generate a plurality of keys for a plurality of message types based on the subscriber identifiers, identify a first logical scalable unit that includes a first database memory that stores a first type of data relating to the subscriber by using a first key of the plurality of keys to query a data locality table, identify a first application processor in the multiprocessor computing system that is part of the first logical scalable unit, and send the first communication message and the plurality of keys to the first application processor.

18 Claims, 26 Drawing Sheets

(52) U.S. Cl.
CPC ............ *H04L65/80* (2013.01); *H04L 67/1006* (2013.01); *H04L 67/1014* (2013.01); *H04L 67/1031* (2013.01); *H04L 67/1034* (2013.01); *H04L 67/327* (2013.01)

(56) References Cited

OTHER PUBLICATIONS

European Search Report, EP Application No. 13169822, Dec. 9, 2013.

European Search Report, EP Application No. 13169824, Dec. 9, 2013.

European Search Report, EP Application No. 13169823, Dec. 9, 2013.

Toshiki Hayashi, 'Evolved Packet Core (EPC) Network Equipment for Long Term Evolution (LTE)', XP-002713567, Fujitsu Sci Tech. J. vol. 48, No. 1, Jan. 2012.

Gouveia et al., 'Cloud Computing and EPC / IMS Integration: New Value-Added Services on Demand', Fraunhofer Institute FOKUS, Berlin, Germany, Technische Universität Berlin, Berlin, Germany, 2009.

\* cited by examiner

SYSTEM AND METHOD FOR COMMUNICATING IN A TELECOMMUNICATION NETWORK VIA INDEPENDENT KEY ROUTING AND DATA LOCALITY TABLES

RELATED APPLICATIONS

This application claims the benefit of priority to U.S. Provisional Application No. 61/652,731, titled "System and Method for Proportionally Scaling Stateful Application Servers within a Telecommunications Network" filed May 29, 2012, the entire contents of which are hereby incorporated by reference.

BACKGROUND

Telecommunications networks have seen very rapid advances in their numbers of users, and the types of services available. In particular, the combination of data-orientated mobile telecommunications networks (e.g., 3G, 4G, LTE, Wi-Fi, etc.) and feature rich smart phones and tablet devices has enabled users to consume a greater variety of services. These increases in the number of users, and the types of services available, have increased the need for telecommunications network operators to deploy new nodes, such as policy application servers and charging application servers, within their infrastructures.

Another recent development within the computing industry has been the proliferation and availability of cheap computing resources, which in turn has facilitated scalable computing. Initially this was achieved through hardware advances, such as the transition from costly specialized mainframe hardware to the more readily available, and relatively inexpensive, commodity hardware. This commodity hardware is constantly becoming smaller and more efficient through economies of scale, and this has enabled datacenters to deploy an ever increasing amount of computer resources per cubic meter.

More recently, there has been a widespread adoption of virtualization technology, and this in turn has lead to the growth in popularity and use of cloud computing platforms. These cloud computing platforms enable the rapid (typically within seconds or minutes) scaling-up and scaling-down of computing resources in order to meet the current demand. Further, these computing resources are typically available for other uses when they would otherwise be underutilized. These computing resources are normally very cost effective, and they are only paid for the periods during which they are consumed.

Cloud computing environments may provide different types of resources as services, such as physical computing resources (known as Infrastructure-as-a-Service) or standardized software environments (known as Platform-as-a-Service). Cloud computing environments may be public, private, or hybrid. In public clouds, or community clouds, the infrastructure is shared between many organizations on a commercial basis. In private clouds the infrastructure is owned, operated, and used by a single organization. Hybrid clouds are a mix of public and private clouds.

Certain types of application servers, such as stateless application servers, can instantly benefit from being scaled using scalable computing resources, such as that provided by cloud computing environments. The throughput performance of these application servers is typically directly proportional to the performance of the scalable computing resources. However, other types of application servers, such as stateful application servers, are unable to scale linearly using existing scalable computing resources and solutions.

Many of the application servers required by telecommunications network operators are stateful. For example, both policy application servers and charging application servers need to maintain session stores that contain stateful information. Further, telecommunications network operators require that these application servers operate in a high-availability manner, such that they contain enough redundancy to ensure that there is not a single point-of-failure. New methods and systems that enable the scaling of such stateful and highly available application servers using scalable computing resources will be beneficial to telecommunication service providers and to consumers of services provided by telecommunication networks.

SUMMARY

The various embodiments include methods, devices and systems configured with processor-executable instructions to implement methods of storing, performing, and organizing data, communications, and components in a telecommunication system so that the system better supports elastically scalable databases, achieves improved data locality, reduces the latency of the components, and achieves faster response times.

An embodiment method of routing communication messages in a telecommunication network includes receiving a first communication message in a processor of a multiprocessor computing system, the first communication message including subscriber identifiers that uniquely identify a subscriber, generating in the processor a plurality of keys for a plurality of message types based on the subscriber identifiers included in the first communication message, identifying in the processor a first logical scalable unit that includes a first database memory that stores a first type of data relating to the subscriber by using a first key of the plurality of keys to query a data locality table, identifying a first application processor in the multiprocessor computing system that is part of the first logical scalable unit, and sending the first communication message and the plurality of keys from the processor to the first application processor.

In an embodiment, sending the first communication message from the processor to the first application processor includes sending the first communication message to a first application component in the first application processor. In a further embodiment, the method includes receiving the first communication message and the plurality of keys in the first application processor, identifying in the first application processor a second logical scalable unit that includes a second database memory that stores a second type of data relating to the subscriber via a second key of the plurality of keys, storing the first key in the second database memory, retrieving subscriber data from the first database memory, performing application-level operations using the subscriber data retrieved from the first database memory and the first communication message, generating a second communication message based on the subscriber data retrieved from the first database memory, and sending the second communication message from the first application processor to the processor.

In a further embodiment, the method includes receiving the second communication message in the processor, and routing the second communication message to another component or sub-system in the telecommunication network.

In a further embodiment, the method includes receiving in the processor information identifying that the first type of data relating to the subscriber is now stored in a third database memory, and updating at least one data locality table in response to receiving the information identifying the third database memory as storing the first type of data. In a further embodiment, the method includes receiving in the processor a third communication message, identifying a second key in the plurality of keys for the third communication message based on information included in the third communication message, determining whether a second logical scalable unit includes a second database memory that stores a second type of data by using the second key to query the data locality table, identifying a second application processor in the multiprocessor computing system that is part of the second logical scalable unit, and sending the third communication message from the processor to the second application processor.

In a further embodiment, the method includes receiving the third communication message in the second application processor, retrieving the first key from the second database memory, identifying a third logical scalable unit that includes a third database memory that stores the first type of data based on the first key, retrieving subscriber data from the third database memory, performing application-level operations using the subscriber data retrieved from the third database memory, generating a fourth communication message based on the subscriber data retrieved from the third database memory, and sending the fourth communication message from the second application processor to the processor.

In a further embodiment, receiving the first communication message in the processor includes receiving a Gx communication message in the processor, and receiving the third communication message in the processor includes receiving an Rx communication message in the processor.

A further embodiment includes a computing device, such as a server or router, configured with processor-executable instructions to perform operations of the embodiment methods described above.

A further embodiment includes a non-transitory processor-readable medium on which are stored processor-executable instructions configured to cause a processor to perform operations of the embodiment methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DESCRIPTION

Figure 1:
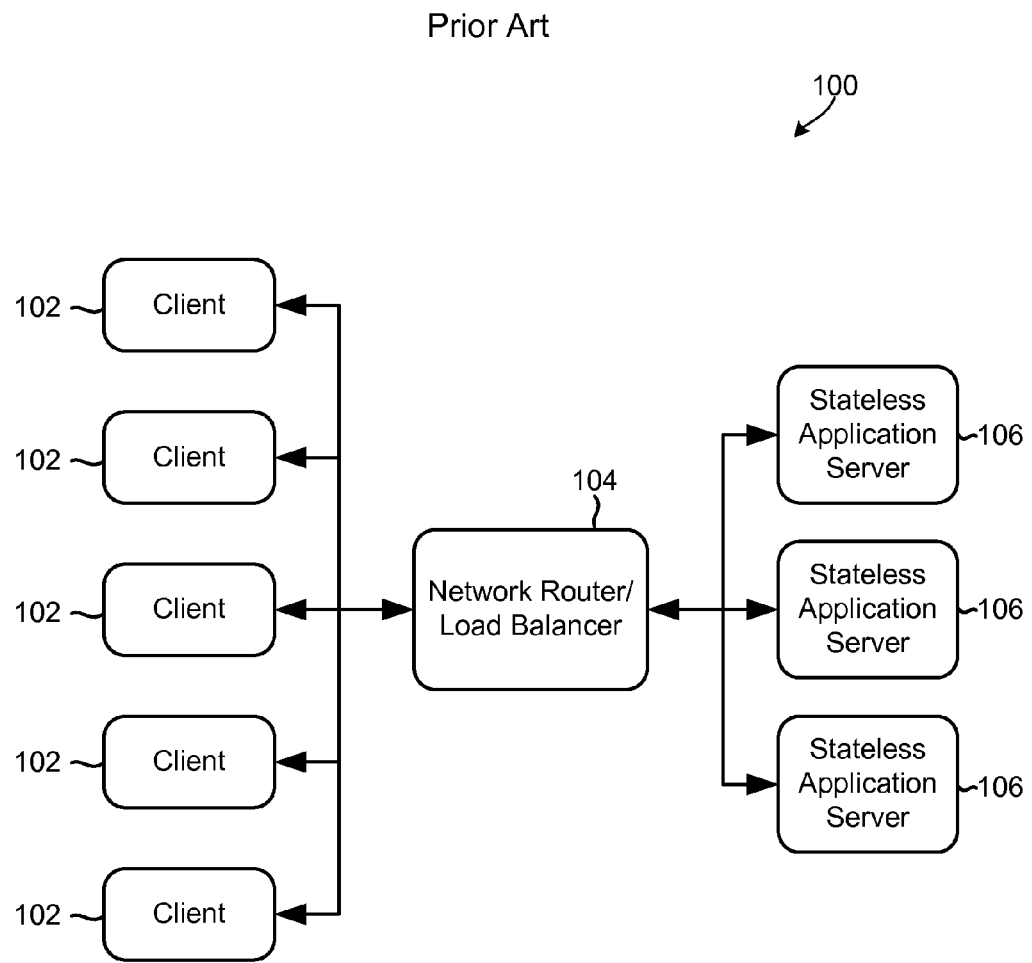
FIG. 1 is a block diagram illustrating a prior art system for connecting multiple clients to multiple stateless servers in a scalable computing environment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a single process and/or thread of execution. A component may be localized on one processor or core, or distributed between two or more processors or cores. In addition, components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

As used in this application, the phrase "data locality" refers to the proximity of data (or the component or memory storing the data) to the application or component that accesses the data or is tasked with processing the data.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

The various embodiments provide methods, devices and systems for managing communications in a network. The various embodiments include methods, and servers configured to implement the methods, of using scalable computing resources to allow stateful application servers within telecommunication networks to scale up or down commensurate with the computing demands, network traffic, or workload placed on the network.

FIG. 1 illustrates a prior art system 100 in which multiple clients 102 connect to multiple stateless application servers 106 via a router 104 configured to provide load balancing functionality. The load balancing functionality may be as simple as performing round-robin load balancing operations in which requests received from the clients 102 are distributed evenly across all the available stateless application servers 106. The clients 102 may include any type of software application, service or component that consumes any of the services provided by the stateless application servers 106.

Figure 2:
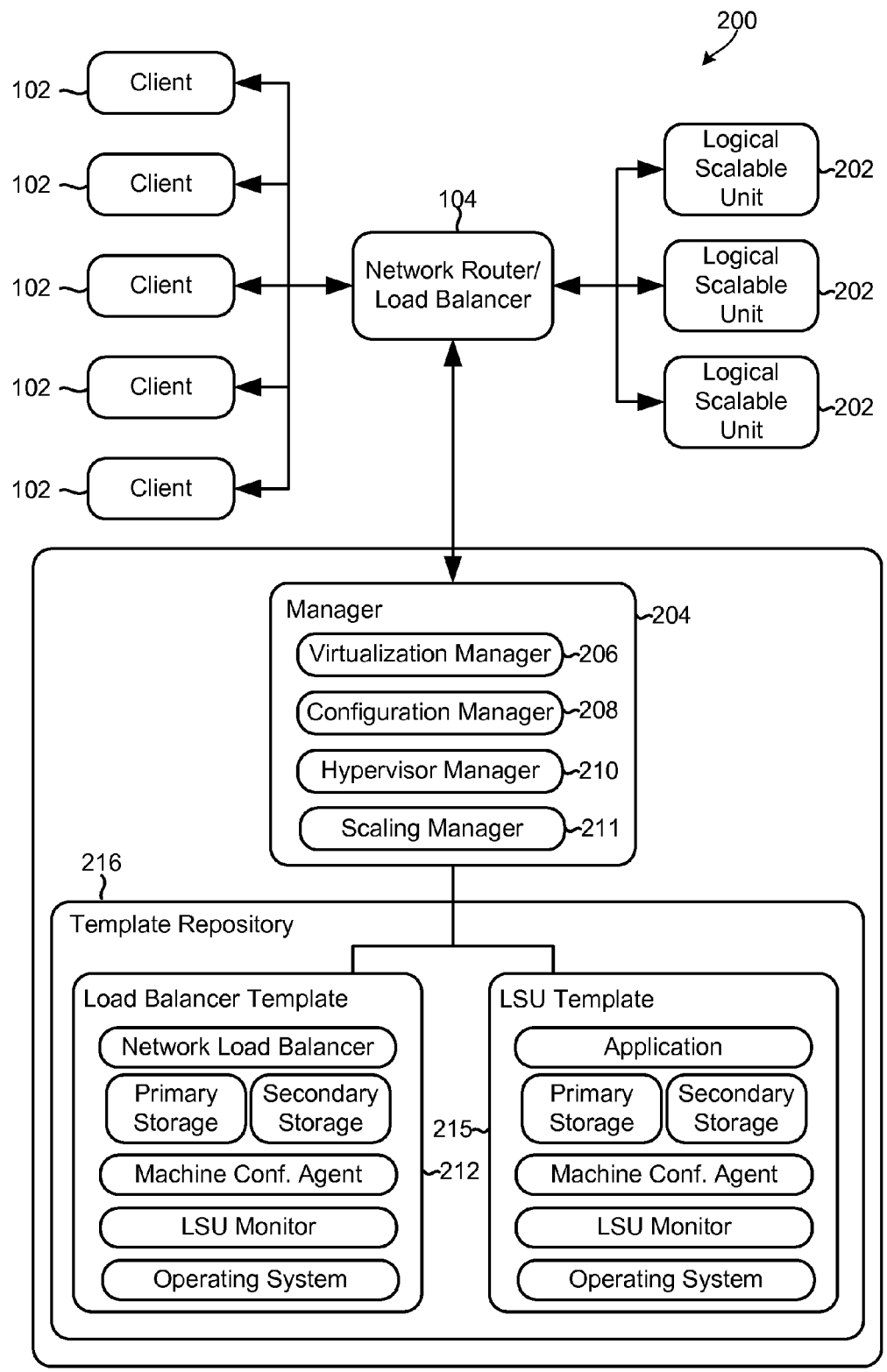
FIG. 2 is a block diagram illustrating an embodiment system for connecting multiple clients to logical scalable units in a scalable computing environment.

FIG. 2 illustrates an embodiment system 200 in which multiple clients 102 are connected to logical scalable units 202 in lieu of the stateless application servers 106. Each logical scalable unit 202 may include a collection of internal components having a single external service interface that operates as a façade/interface to the internal components. The internal components of the logical scalable unit 202 may include application servers, routers, memories, persistent storage units, and other similar components. Each logical scalable unit 202 may be configured to provide a quantifiable level of throughput or services (e.g., measured in transactions per second or "TPS"), and may operate independent of all of the other logical scalable units 202 included in the system 200. In an embodiment, each logical scalable unit 202 may be the smallest discrete grouping of components suitable for providing a defined functionality.

For embodiments suitable for deployment in a 3GPP network, the clients 102 may include a policy and charging enforcement functions (PCEFs) component and/or an application functions (AFs) component. The router 104 may be a Diameter routing agent (DRA) as described in 3GPP TS 23.203 and 3GPP TS 29.213, or a dynamic context router (DCR) as described in U.S. patent application Ser. No. 13/309,008 titled "Methods, Systems And Devices For Dynamic Context-Based Routing," the entire contents of both of which are hereby incorporated by reference.

The overall system throughput of the system 200 may be increased by adding additional logical scalable units 202 to the system 200. Each individual logical scalable unit 202 may be organized or configured to provide a number of features that enable the overall system 200 to be an elastic and/or horizontally scalable computing environment. The logical scalable units 202 may include online charging systems (OCSs), offline charging systems (OFCSs), and/or policy control and charging rules functions (PCRFs). The protocols used for communication between these nodes may be Diameter based protocols such as Gx, Gy, Rx, Sy, S9, Gxa, Gxc, Sd, Sh, etc.

In an embodiment, the network router 104 may be configured to load balance messages across the logical scalable units 202. The network router 104 may be configured to associate sessions with logical scalable units 202, and may route messages to the appropriate logical scalable units 202 when the messages are part of an existing session. The network router 104 may perform load balancing operations to route messages that are not part of an existing session to the logical scalable units 202, which may be accomplished by implementing a round-robin load balancing scheme or may be performed based on the measured or detected workloads of the logical scalable units 202.

The system 200 may be a scalable computing environment, which in an embodiment, may be realized by provisioning and/or enabling a single server rack/chassis within a datacenter to operate as a logical scalable unit 202.

In an alternative embodiment, the scalable computing environment may be realized via a cloud computing environment. In this embodiment, a logical scalable unit 202 may be provisioned, created, organized, and/or generated dynamically, using resources (e.g., application servers, persistent storage, load balancers, etc.) within a cloud computing environment, network, or service. Within such a cloud computing environment each application server may be realized using a virtual server, which along with other virtualization technologies, allows the physical servers and storage devices to be shared by many devices/clients. Virtualization technologies may also be used to replicate, transfer, or migrate stored data and applications from one physical location/server to another efficiently and without impacting the users or applications of the cloud computing system.

In an embodiment, the scalable computing environment may be realized in a multi-datacenter environment, in which case, a single logical scalable unit 202 may be distributed across two or more datacenters. A logical scalable unit 202 may provide or make use of geo-redundancy, in which data and/or functionality is replicated between two geographically distant sites so that clients and applications can switch from one site to another seamlessly and without impacting the operations of the system.

The system's 200 capabilities may be scaled up or down by increasing or decreasing the number of logical scalable units 202. In an embodiment, scaling up the scalable computing environment may include adding new logical scalable units 202 to the system 200 in response to an increase in the number of sessions. In an embodiment, scaling down the scalable computing environment may include stopping the sending of new messages to the logical scalable unit 202, and subsequently waiting for existing sessions of an existing logical scalable unit 202 to expire before removing that logical scalable unit 202 from the system 200. These embodiments are particularly well suited for use with data that has a short life cycle (e.g., policy-based sessions, etc.). In an embodiment, data may be migrated from one logical scalable unit 202 to another logical scalable unit 202 without interrupting the operation of system 200. This embodiment is particularly well suited for use with data that has a long life cycle (e.g., subscriber information, balance information, and Voice over LTE using IP Multimedia Subsystem (IMS), etc.).

In an embodiment, the system 200 may include a manager 204 component configured to dynamically increase and/or decrease the computing resources available or used by the system 200 to match detected increases or decreases in computing demands. The manager 204 may adjust the computing resources by implementing any of a number of known methods, any of the methods or solutions discussed herein, or any combination thereof. For example, the scalability manager may adjust the computing resources by increasing or decreasing the number of application servers within one or more logical scalable units and/or by increasing or decreasing the number of logical scalable units included in the scalable computing environment/system, etc.

In the example illustrated in FIG. 2, the manager 204 component includes a virtualization manager 206, a machine configuration manager 208, a hypervisor manager 210, and a scaling manager 211. The virtualization manager 206 may be configured to manage deployments and monitor the various virtual machine instances. The machine configuration manager 208 may be configured to automatically configure the operating systems and applications running on the virtual machines within the logical scalable units 202. The hypervisor manager 210 may be used to configure and provision new hypervisors, such as by creating new virtual hardware suitable for use in or as a virtual machine. The scaling manager 211 may be configured to monitor application level performance and/or the performance of the logical scalable units 202, and perform various operations to scale the system up or down based on the monitored performance.

The manager 204 component may include a template repository 216 that includes a plurality of templates 212, 215 suitable for use in creating/instantiating new instances of network routers/load balancers 104 (e.g., load balancer template 212) and logical scalable units 202 (e.g., LSU template 215). In an embodiment, each of the templates 212, 215 may be a component that includes an operating system and application. The operating system and application may be selected, grouped or packaged together so as to provide a specific functionality while balancing reliability, consistency, speed, latency, responsiveness, etc. In an embodiment, the templates 212, 215 may include well tested components that have been tested and determined to provide a high level of consistency or reliability. The templates 212, 215 may allow for additional functionality or components to be rapidly deployed in the system 200, and reduce the number or likelihood that the addition of components will cause deployment or configuration errors. In an embodiment, there may be multiple versions of the same LSU template in order to facilitate upgrades and roll-backs to the telecommunications network.

In various embodiments, the logical scalable units 202 may include virtualized data plane components and/or virtualized control plane components, such as virtualized routers, policy servers, online charging servers, offline charging servers, persistent storage, mobile application servers, deep packet inspectors (DPIs), gateways (e.g., PCEFs), etc. Mobile application servers that are suitable for inclusion in a logical scalable unit 202 are described in U.S. patent application Ser. No. 13/454,896 titled "Systems for Enabling Subscriber Monitoring of Telecommunications Network Usage and Service Plans," the entire contents of which is hereby incorporated by reference. Deep packet inspectors may be standalone, embedded in the gateway (e.g., a 3GPP Application Detection Control (ADC) within a PCEF), or a 3GPP-compliant Traffic Detection Function (TDF).

In an embodiment, one or more components in a logical scalable unit 202 may be virtualized, and the logical scalable unit 202 may be configured to provide various different types of functionality. For example, a logical scalable unit 202 may be configured to provide any or all of policy functionality, online charging functionality, offline charging functionality, analytics functionality, machine-to-machine (M2M) functionality, voice functionality, video functionality, audience measurement functionality, cable television functionality, etc.

Figure 3:
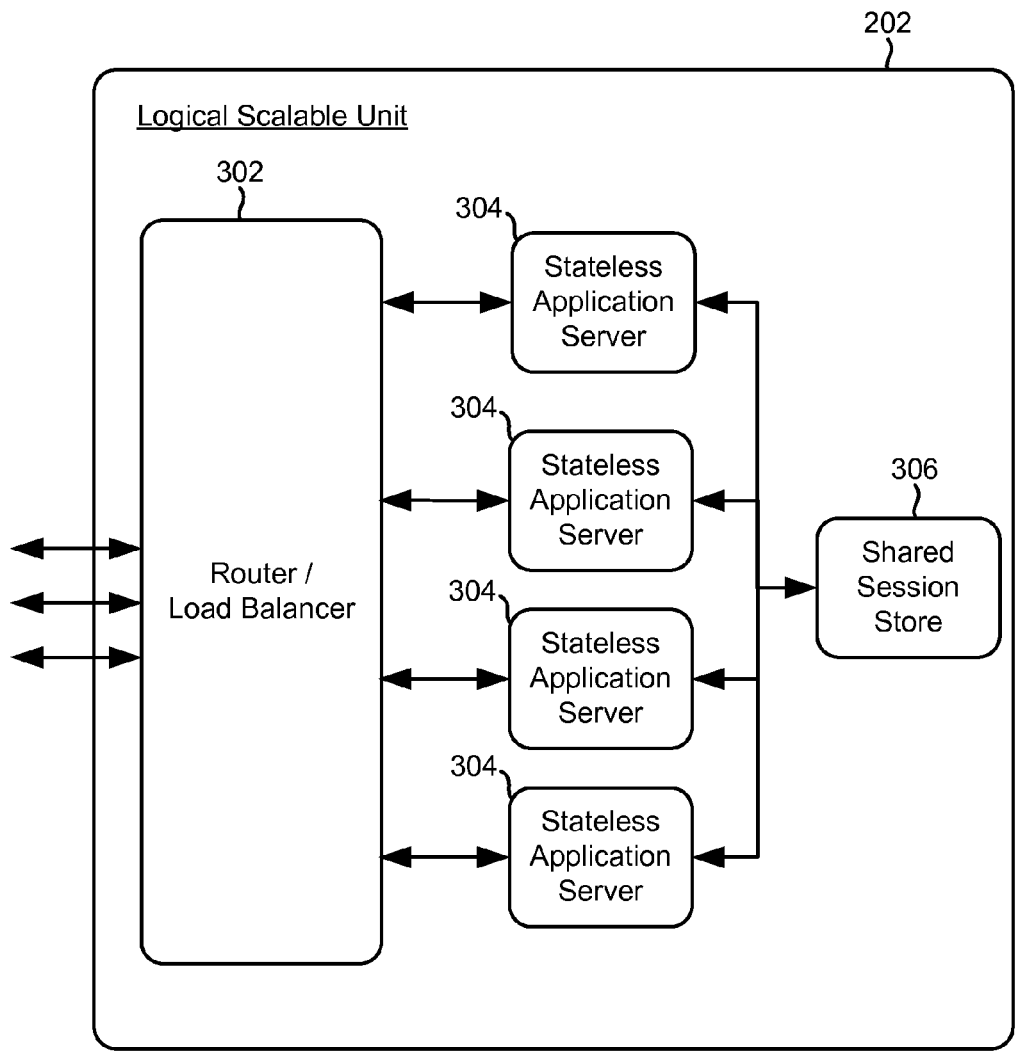
FIGS. 3 and 4 are block diagrams illustrating example logical and functional components in an embodiment logical scalable unit.

FIG. 3 illustrates example logical and functional components that may be included in an embodiment logical scalable unit 202. In the example illustrated in FIG. 3, the logical scalable unit 202 includes a router 302, a plurality of stateless application servers 304 and a shared session store 306 memory. The router 302 may be configured to operate as a load balancer. The router 302 may be aware of a session state within the logical scalable unit 202, and when the messages are part of an existing session, the router 302 may use the session state information to route messages to the appropriate stateless application servers 304.

The router 302 may perform load balancing operations to distribute messages that are not part of an existing session to the various application servers 304. Such load balancing operations may include performing a round-robin load balancing algorithm and/or distributing the messages based on the measured or detected workloads of the application servers 304.

Each application server 304 may be implemented on an independent server computing device, and all of the application servers 304 may have access to a shared session store 306.

In an embodiment, each logical scalable unit 202 may contain a subscription profile repository (SPR) and/or a unified data repository (UDR).

In an embodiment, the router 302 in the logical scalable unit 202 may be configured to send and receive information to and from a network router 104. In an embodiment, the router 302 may be a network router 104.

Figure 4:
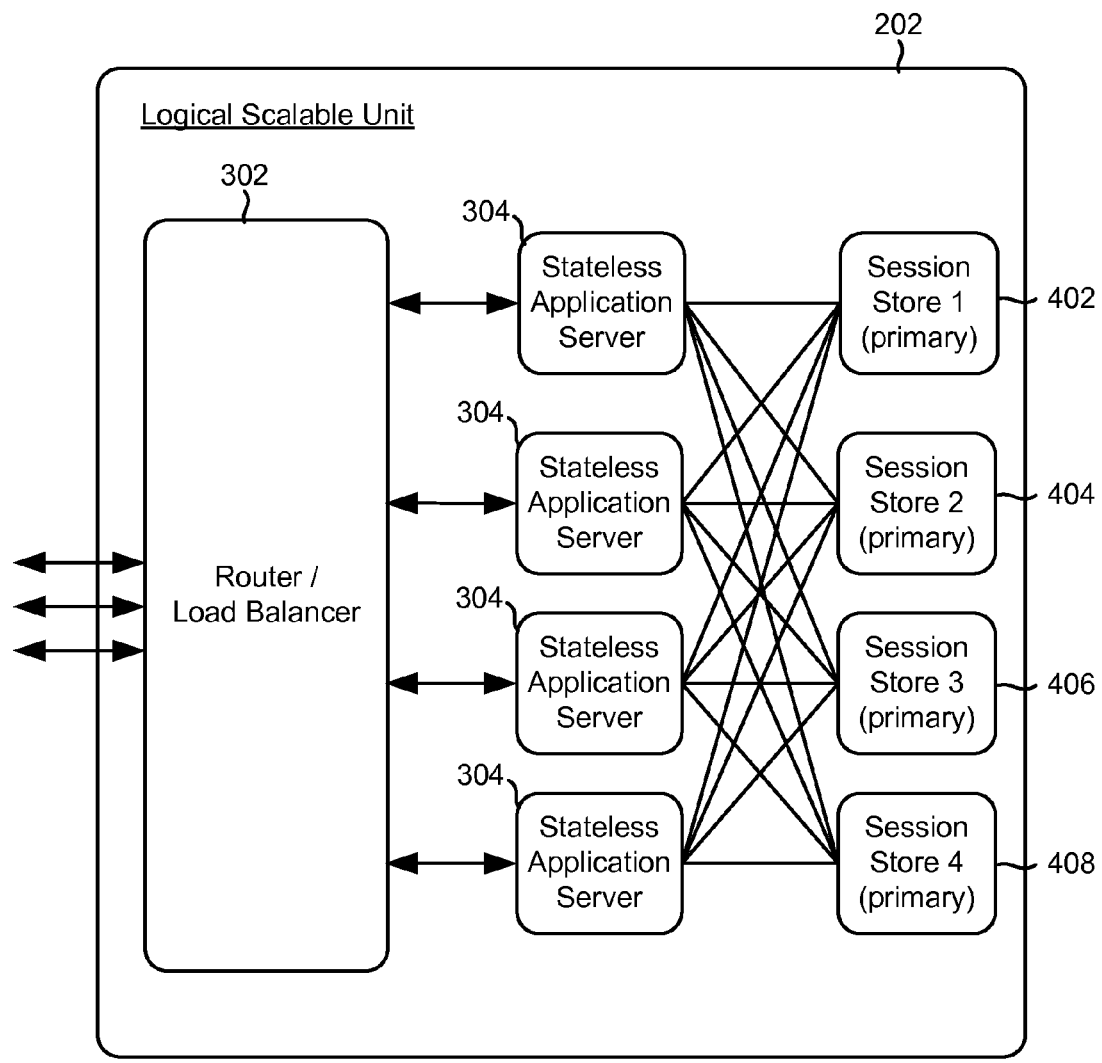

FIG. 4 illustrates example logical and functional components that may be included in another embodiment logical scalable unit 202. In the example illustrated in FIG. 4, the logical scalable unit 202 includes a shared session store made up of a plurality of session stores 402-408. Each session may be associated with a single session store 402-408, and each stateless application server 304 may be configured to communicate with each of the plurality of session stores 402-408.

In an embodiment, each session store 402-408 may be implemented in a separate or independent server computing device. In an alternative embodiment, each session store 402-408 may be implemented on a server that includes one or more of the stateless application servers 304.

In an embodiment, each session store 402-408 may be replicated on a second server, i.e. the primary session store 1 may be on server 1 and the secondary session store 1 may be on server 2, the primary session store 2 may be on server 2 and the secondary session store 2 may be on server 3, etc. This embodiment provides enhanced redundancy within the logical scalable unit 202 by ensuring that there is a replicated session store available in the event that one of them fails.

Figure 5:
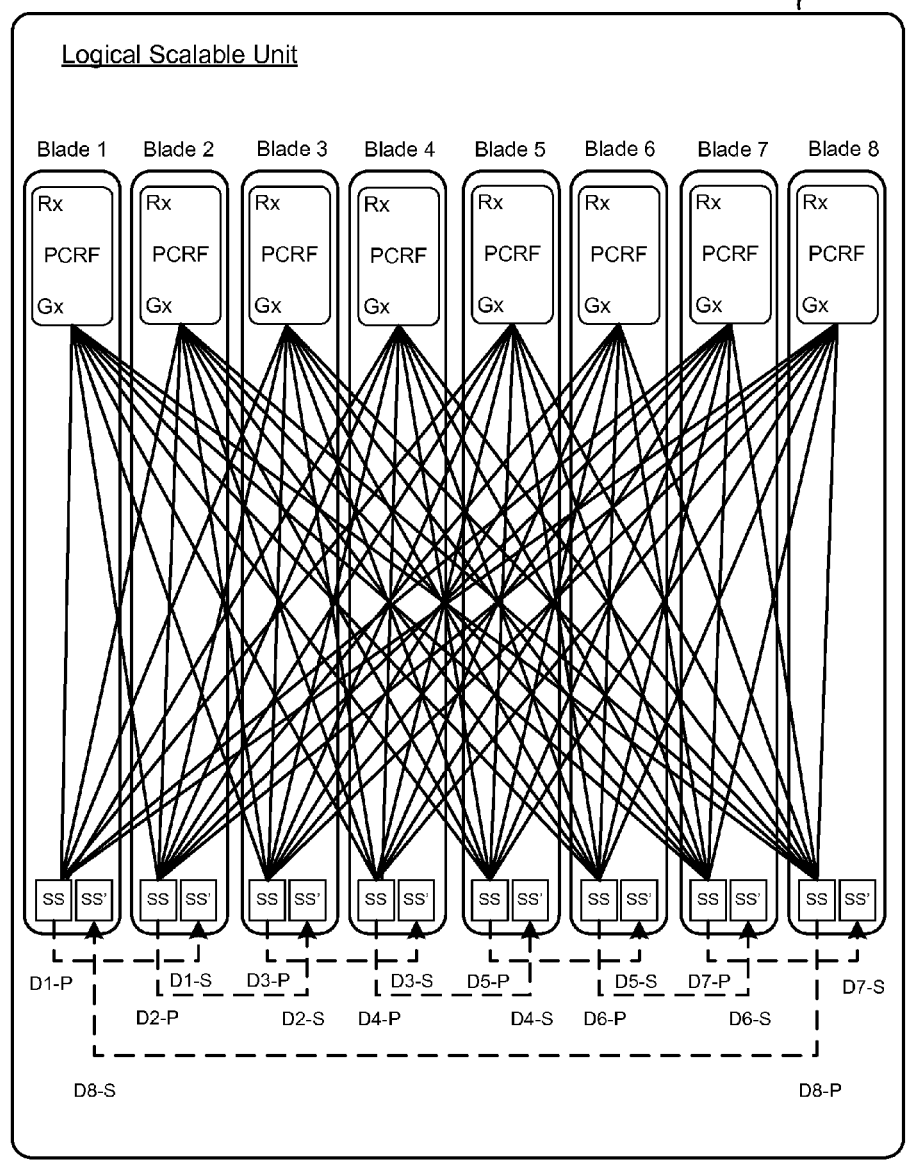
FIG. 5 is a block diagram illustrating an example logical and functional components in an embodiment logical scalable that suitable for use in a 3GPP network.

FIG. 5 illustrates example logical and functional components that may be included in another embodiment logical scalable unit 202 suitable for use with a 3GPP network. In the example illustrated in FIG. 5, the logical scalable unit 202 includes a router 302 (not shown in FIG. 5) configured to load balance Rx and Gx messages across eight PCRFs. The logical scalable unit 202 also includes a shared session store that is split into eight session stores (SS), and each session store has a primary and a secondary store to improve redundancy. For example, the logical scalable unit 202 may include eight servers, each of which may host a single PCRF, a primary session store (SS), and an unrelated secondary store (SS').

The logical scalable unit 202 may be configured so that when an application server fails (e.g., the PCRF on Blade 1), the router 302 redistributes the messages previously associated with the failed PCRF across the remaining seven PCRFs. In the event of such a failure, the session stores (i.e., D1-P and D8-S) may continue functioning so that the state or state information is not lost. When the logical scalable unit 202 is configured in this manner, components outside of the logical scalable unit 202 do not need to be informed of the PCRF failure, and can continue to communicate with the logical scalable unit 202 without an interruption in service.

In an embodiment, the logical scalable unit 202 may be configured to manage component failures by performing failover operations that automatically switch over to a redundant component (e.g., blade, server, memory, etc.) upon the failure or abnormal termination of a component. For example, when a primary session store fails (e.g., D1-P on Blade 1 in FIG. 5), a PCRF may failover or automatically switch to a secondary session store (i.e., D1-S on Blade 2). The associated secondary session store (i.e., D1-S on Blade 2) may be promoted to become the primary session store, and only the individual PCRF will be aware of this session store change/failover. In an embodiment, the session stores may use transparent connectivity technology that hides the detail of the primary and secondary session stores from the stateless application servers 304.

The logical scalable unit 202 may be configured so that when an entire server fails (e.g., Blade 1 in FIG. 5), the router 302 in the logical scalable unit 202 redistributes the messages previously associated with a PCRF associated with the failed server (e.g., the PCRF on Blade 1) across the remaining seven PCRFs. Further, the remaining seven PCRFs may failover from the failed primary session store (i.e., D1-P on Blade 1) to the associated secondary session store (i.e., D1-S on Blade 2). The associated secondary session store may be promoted to become the primary session store. In this case, one of the remaining primary session stores (i.e., D8-P on Blade 8) may no longer be associated with a secondary session store.

The various embodiment scalable computing environment and systems may be configured to support the addition and removal of additional or new logical scalable units 202 to best meet the current computing demands of the system, while the system continues performing its regular operations and without causing any interruptions or loss of service. This may be accomplished may implementing any or all of the components configurations discussed above with reference to FIGS. 1-5.

In an embodiment, the network router 104 (shown in FIG. 2) may be configured to provide enhanced routing capabilities that enable it to select both the logical scalable unit 202 and the stateless application server 304 within the logical scalable unit 202. In this embodiment, the network router 104 may be configured to perform load balancing operations (e.g., round-robin load balancing operations), which may include receiving communication messages from the clients 102 and distributing the received communication messages across the available application servers 304, choosing the stateless application servers 304 that are not associated with an existing session. The load balancer operations may also include routing messages belonging to existing sessions to another application server within the same logical scalable unit 202 in response to detecting the failure of a stateless application server 304. This may remove the requirement to include a router 302 within the logical scalable unit 202, but may require a more powerful network router that configured to be aware of both the logical scalable units 202 and the stateless application servers 304.

In an embodiment, the logical scalable unit 202 may be generated or organized to include other logical scalable units 202. For example, an embodiment scalable computing environment or system may include a parent logical scalable unit that includes one or more child logical scalable units. The parent and child logical scalable units may be organized into a hierarchical tree structure. In an embodiment, one or more child logical scalable units may be included in a parent logical scalable in lieu of one or more stateless application servers 304.

In various embodiments, a logical scalable unit 202 may be configured, generated, arranged, or organized to describe or provide a unit of processing power or functionality that can be replicated and/or used to horizontally scale a solution, deployment, system, or resource on a large (or unlimited) scale. The logical scalable unit 202 may make system data central to the system configuration/architecture and/or reduce the number of endpoints that are visible to the router components, reducing the system's complexly and improving its performance.

Each individual logical scalable unit 202 may be organized to include all the information and resources needed to process a defined number of tasks or events, and may operate independently of all other LSUs in the system (i.e., does not share stateful information with other LSUs, etc.). The logical scalable unit 202 may also be configured to allow additional processing units, components, or computing resources to be added or removed from the system/solution without requiring changes to other components in the system. The logical scalable unit 202 may be configured to allow for the federation or sharding or partitioning of data into logical units, which may split or distribute processing. The logical scalable unit 202 may allow the system to dynamically adjust its use of hardware and network resources so that they are commensurate with the demands placed on the system.

An embodiment scalable computing environment or system may include two or more logical scalable units 202 that share stateful information. By including two or more logical scalable units 202 that share stateful information in the scalable computing environment or system, the various embodiments systems may provide a telecommunication system with seamless scalability that requires very little or no downtime for expansion or addition of computing resources (i.e., is elastically scalable).

In an embodiment, the scalable computing environment or system may include two or more logical scalable units that do not share stateful information with one another. Each logical scalable unit may operate independently of the other logical scalable units in the system, and as a result, the system may achieve improved elasticity (i.e., because each logical scalable unit can be brought online and taken offline without impacting other logical scalable units in the system).

Generally, improving the scalability of applications and components (e.g., PCRF, OCS, etc.) that are deployed or included in a telecommunication system is an important design criterion for network engineers, telecommunications operators, and designers of telecommunication systems. Elastic scalability is the ability of a network or system to respond to changes in the workload, communications, signaling, and/or traffic demands of the telecommunication network, which may be accomplished by adding or removing various components (e.g., logical nodes, computing devices, memories, software applications, processes, etc.) to the network/system to adjust the system's overall throughput so that it is commensurate with the current or predicted future demands of the system.

It is often difficult to deploy or implement solutions that are elastically scalable in existing telecommunication systems due to the speed, latency, responsiveness, and availability requirements placed on such systems by their subscribers, client applications, and telecommunications operators. For example, many applications (e.g., PCRF, OCS, etc.) require access to subscriber information that is stored in a database, and as a result, the scalability of these applications often depends on the scalability of the underlying database solution. Yet, many existing scalable database solutions (e.g., solutions built on NUODB®, VOLTDB®, CASSANDRA®, MONGODB®, etc.) utilize a distributed or cloud-based architecture in which the actual or physical location (e.g., the datacenter, rack, server computing device, memory, database node, etc.) of the stored information changes frequently (i.e., as the database is scaled up or down) and/or cannot be determined in advance. As a result, requests to access information stored in a distributed database system typically require that the database system perform extra processing and/or routing operations to locate or identify the component in which the data is stored. These additional operations may increase data access times of the database or the latency of the requesting application. While such latencies (15-100 milliseconds) may be acceptable in web-based applications and solutions, they are not acceptable for many of the applications (e.g., PCRF, OCS, etc.) that are included in a high-speed telecommunication system, which often require that data access times and latencies be kept below 5 milliseconds.

Figure 6:
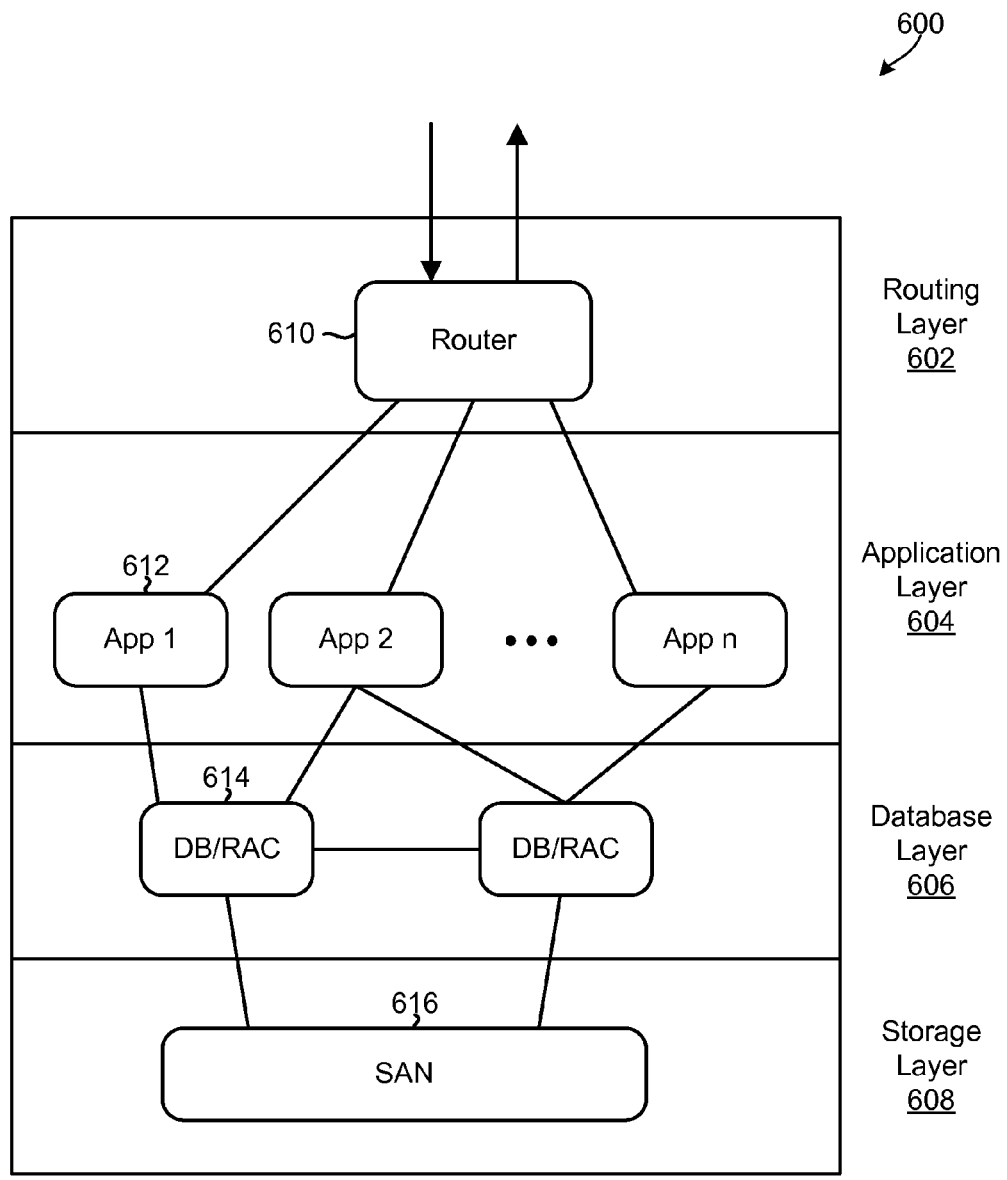
FIG. 6 is a block diagram illustrating the communication links and logical and functional components in an example telecommunication system having a centralized storage system.

FIG. 6 illustrates communication links and logical and functional components in an example telecommunication system 600 having a centralized storage system. The telecommunication system 600 is organized using a layered architecture that includes a routing layer 602, an application layer 604, a database layer 606, and a storage layer 608. In each of these layers, various hardware and/or software components may implement functionality that is commensurate with responsibilities or groups or categories of operations assigned to that layer. In the example illustrated in FIG. 6, the routing layer 602 includes a router 610 component, the application layer 604 includes a plurality of application server nodes (App 1-App n) 612, the database layer 606 includes two databases/real application clusters (RAC) 614, and the storage layer 608 includes a single centralized storage area network (SAN) 616. Each of the application server nodes 612 may be or include an application component (e.g., PCRF, OCS, etc.).

The telecommunication system 600 illustrated in FIG. 6 is not easily scalable because the database layer 606 is not horizontally scalable, and all the data is stored in a single centralized SAN 616. That is, the addition of a significant number of new applications or components in the system 600 may reduce the speed, performance or responsiveness of system 600. This is because the system uses a centralized storage solution, and each of the added clients/components would be required to read and write data to the same centralized SAN 616 as all the other clients/components in the system 600. This increase in the number of components accessing the same storage unit (i.e., SAN 616) may result in an increase in network communications, traffic, and contention, any or all of which may contribute to an unacceptable increase in the latencies of the applications. Furthermore, telecommunication systems that include centralized storage/database systems are difficult to scale while the system is live. For these and other reasons, telecommunication systems that include centralized storage/database system do not scale well and cannot make efficient use of cloud-based or distributed systems/solutions.

Figure 7:
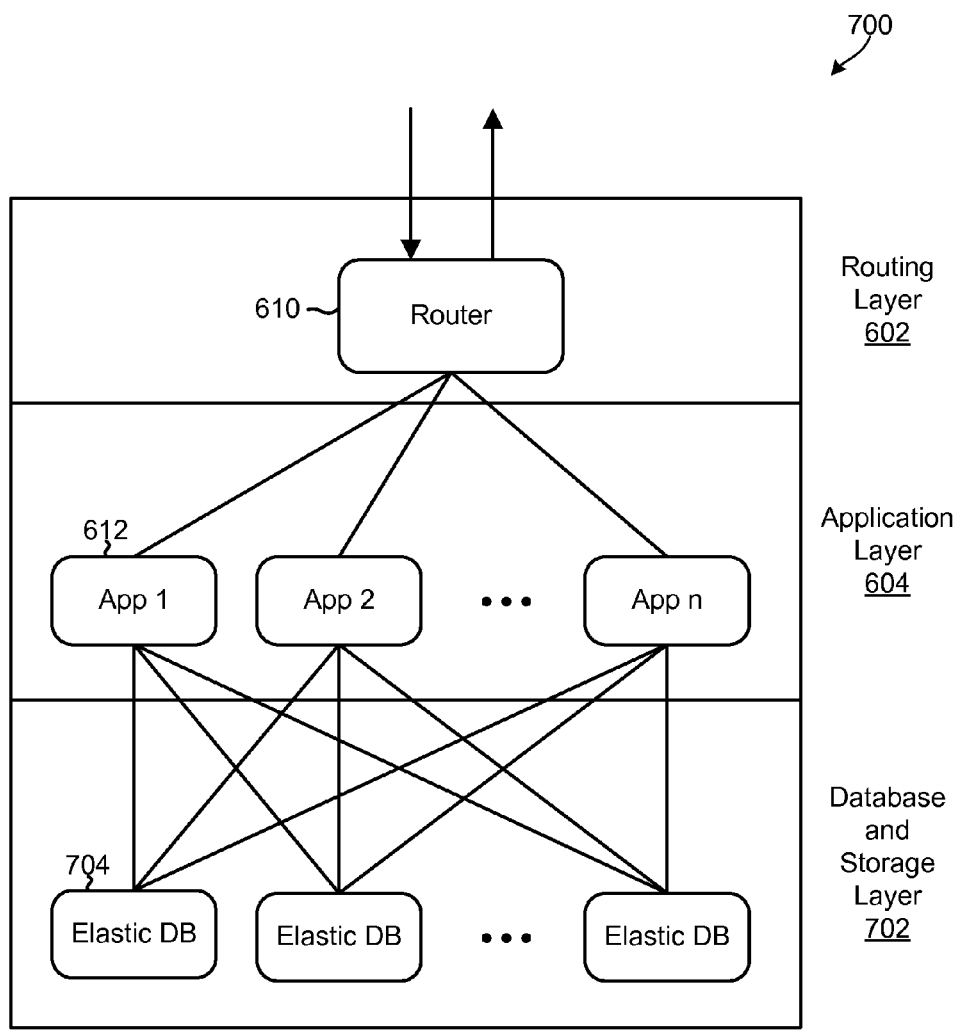
FIG. 7 is a block diagram illustrating the communication links and logical and functional components in an example telecommunication system having a "shared nothing" elastically scalable cloud architecture in which the data is distributed over a number of database nodes/components suitable for use with various embodiments.

FIG. 7 illustrates logical and functional components in an example telecommunication system 700 having a "shared nothing" elastically scalable cloud architecture in which the data is distributed over a number of database nodes/components. The system 700 is organized using a layered architecture that includes a routing layer 602, an application layer 604, and a combined database and a storage layer 702. In each of these layers, various hardware and/or software components may implement functionality that is commensurate with responsibilities or groups or categories of operations assigned to that layer. The routing layer 602 includes a router 610 component, and the application layer 604 includes a plurality of application server nodes (App1-Appn) 612, each of which may be or include an application component. The database and storage layer 702 includes the plurality of elastically scalable database 704 modules or components.

Each of the elastic database 704 modules may be stored or located on an independent database node/component (e.g., in a separate server device, etc.), and each of the application server nodes 612 may include a communication link to each of the elastic database 704 modules. The router 610 may be configured to distribute the system's workload between the application server nodes 612 (e.g., using a round robin node selection method), and each application server node 612 may retrieve data from any of the elastic database 704 modules.

The telecommunication system 700 illustrated in FIG. 7 does not require, use, or include a centralized database system (i.e., SAN 616), and as a result, is more scalable than the system 600 illustrated in FIG. 6. However, the system 700 may not be sufficiently fast or efficient because the stored data is always remote to the application server nodes 612. That is, the system 700 lacks sufficient "data locality" because the data is not stored in close proximity to the application/component that uses or accesses the data, and as a result, components in the system 700 may communicate over large distances via Ethernet, Internet, or other networks or network-based communications that are slow or susceptible to network traffic and network I/O latencies. For these and other reasons, the system 700 may experience slower response times when a significant number of additional components are added to the system 700, and thus such a system is not highly scalable.

The various embodiments include methods, devices and systems configured with processor-executable instructions to implement methods of storing, performing, and organizing data, communications, and components in a telecommunication system so that the system better supports elastically scalable databases, achieves improved data locality, reduces the latency of the components, and achieves faster response times.

Generally, improving a system's "data locality" includes storing the data in close physical, temporal, spatial, and/or logical proximity to the components that are most likely to require access to the data. In the various embodiments, this may be achieved by storing data in a memory that is in the same datacenter, rack, server computing device, virtual server, virtual machine, address space, module, register set, or process as the components that access the data or that are tasked with processing the data.

Using existing solutions, it is difficult to achieve improved data locality in systems that include elastically scalable databases (e.g., the system 700 illustrated in FIG. 7) because the data is stored remotely and the location/memory in which the stored data is not static or fixed. That is, scaling a system that includes an elastically scalable database typically includes performing load balancing operations in which the stored data is relocated to different partitions or shards (i.e., a different horizontal partition). The changing and remote nature of the data storage locations in such systems makes it more difficult to identify or locate the actual or physical component/memory that stores the data in advance, and may require that the system perform additional network input/output, routing, or processing operations to locate, access and/or retrieve the data. These additional operations and communications may increase the latencies of the applications/components in the telecommunication system. For these and other reasons, existing solutions are not suitable for use in highly scalable high-speed telecommunication systems.

The various embodiment methods, systems, and devices may achieve or improve "data locality" in a telecommunication system that includes a plurality of elastically scalable databases by merging and organizing the application, database and storage layers so that the data is (or is more likely to be) stored/located in the same component (e.g., same datacenter, rack, server device, service, process, etc.) as the applications/components that require or request access to that data. By improving data locality, the various embodiments reduce the number of network input/output transactions that must be performed in the telecommunications network, reduce the workload of the network and/or its sub-systems, and/or reduce the overall latency of the applications/components. The various embodiments also improve the efficiency, scalability, and speed of the telecommunication system, its sub-systems, and its applications and components. The various embodiments also allow the telecommunication system to use cloud-based and distributed systems/solutions more efficiently and without significantly impacting the speed or responsiveness of the system.

Figure 8:
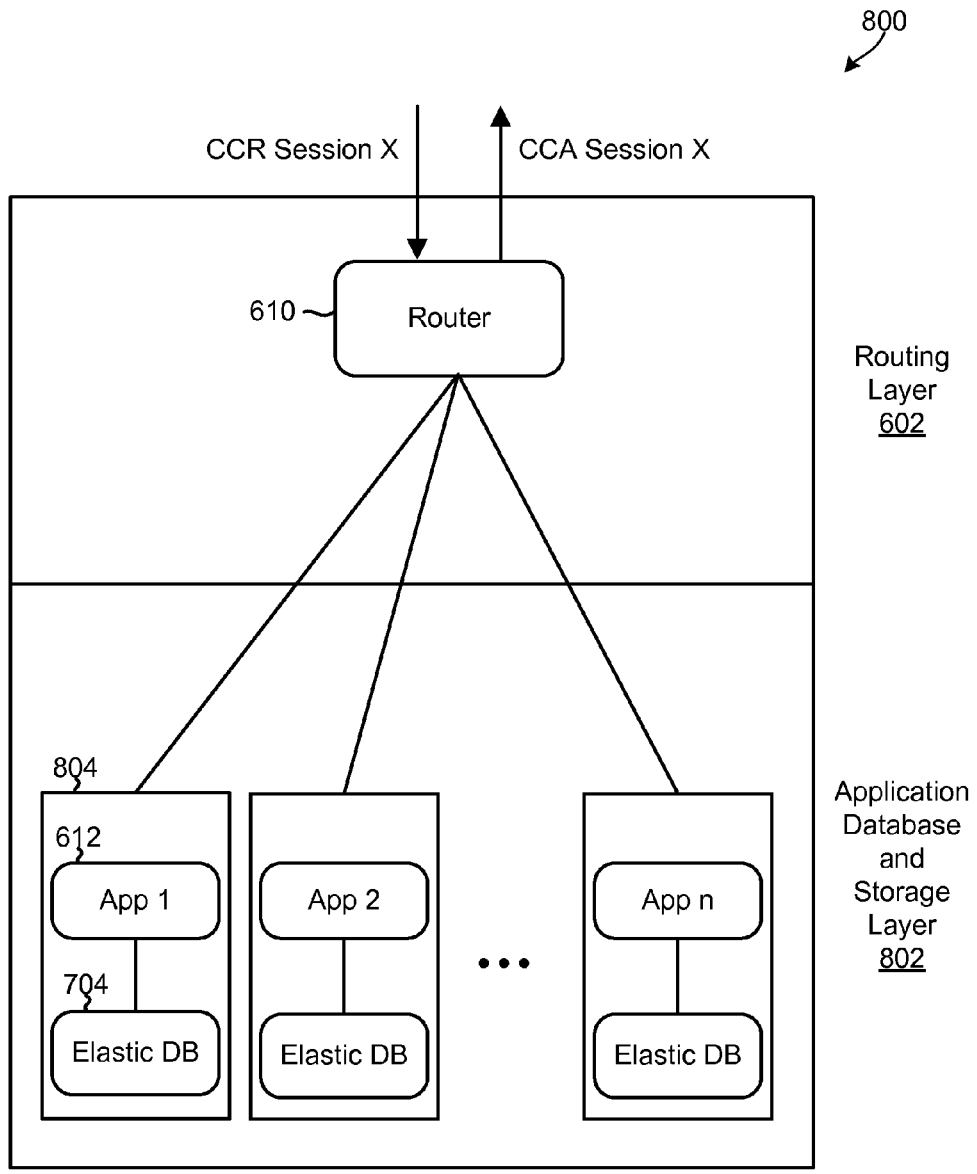
FIG. 8 is a block diagram illustrating the communication links and logical and functional components in an embodiment telecommunication system having a layered architecture in which the application, database, and storage layers are merged to achieve improved data locality.

FIG. 8 illustrates logical and functional components in an embodiment telecommunication system 800 having a layered architecture in which the application, database and storage layers are merged to achieve improved data locality. The system 800 may include a routing layer 602 having a router 610 component. The system 800 may also include a combined application, database, and storage layer 802 that includes a plurality of application server nodes (App 1-App n) 612 and elastic database 704 modules/components. Each of the elastic databases 704 may be stored or located on an independent database node/component (e.g., in a separate server device, etc.), and each of the applications server nodes (App 1-App n) 612 may be an application component that is coupled to an elastic database 704.

In an embodiment, the combined layer 802 may include, or may be organized into, a plurality of modules 804, each of which include an application server node 612 and an elastic database 704. In an embodiment, an entire module 804 may be located, stored or included in a single component (e.g., datacenter, rack, device, component, process, etc.). This may be achieved by storing both the applications and the data used by the applications in the same component (e.g., server computing device). In an embodiment, one or more of the modules 804 may be a logical scalable unit 202. In an embodiment, the system 800 may be a logical scalable unit 202.

The routing layer 602 may be horizontally scalable and/or include a plurality of router 610 components. Each router 610 component may be configured to receive request messages (e.g., a Credit-Control-Request (CCR) request, etc.) and route the received messages to the component (e.g., logical scalable unit 804, etc.) in which data corresponding to request message is stored (e.g., the session). By including a plurality of router 610 components in the routing layer 602, the various embodiments may better ensure redundancy by providing High Availability (HA). Further, the system may include a router 610 component for each of a variety of different message types. In an embodiment, the routing layer 602 may include a Gx router and an Rx router. In an embodiment, the Gx router may be read and write capable and the Rx router may be read-only.

The application server nodes 612 may be any component that may be tasked with processing a request message and requires access to subscriber related data stored in the elastic databases 704, such as a policy management system, charging system, etc. Further, each application server node 612 may include any part or combination of any existing telecommunication node, sub-system, or component. For example, an application server node 612 may include all or slices or portions of any combination of a policy and charging enforcement function (PCEF) component, a policy and charging rules function (PCRF) component, an application function (AF) component, and an online charging system (OCS) component. By combining two or more such functions in a single application, the various embodiments reduce latency and improve performance by reducing the amount of inter-component communications or signaling that is performed in the system. Further, by moving functions and data used by those functions into close proximity, the various embodiments improve the system's data locality.

In an embodiment, the telecommunication system 800 or its components may achieve improved data locality by performing methods and/or implementing solutions that organize, store, or locate all the components and data required to process a request message (e.g., a CCR, etc.) in a single logical scalable unit (i.e., module 804). For example, a single logical scalable unit or module 804 may be organized to include a policy management (e.g., PCRF) component, a subscription profile repository (SPR), reference tables, balance information, and session information in a single server computing device. Including all the components and data required to process a request in a single logical scalable unit (i.e., module 804) may reduce the number of synchronous remote communications that must be performed in the system 800, and reduces the amount of information that is communicated between the components in the system 800, when processing the request message. This may improve the speed, efficiency, and responsiveness of the system 800.

In addition to achieving improved data locality, the telecommunication system 800 may perform methods and/or implement solutions that minimize secondary key lookups (where related sessions are associated/bound with each other based on one or more non-primary session keys), minimize contention, and maximize parallelism of remote communications within the system, any or all of which may be achieved (or are made possible) by organizing the various logical and functional components (e.g., nodes, layers, applications, modules, etc.) in the manner illustrated in FIG. 8. In addition, this grouping/organization allows the telecommunication system 800 to perform methods and implement solutions that cause the system to become highly available, better support elastic scalability, reduce the incidence of failure/failover/recovery conditions, and eliminate the need to include or use a shared or centralized storage system.

As new or additional components are added or removed from the system 800, it is more likely that a component (server, memory, etc.) in the system 800 will fail or experience errors. To maintain high-availability, the system 800 may be required to manage component failures and errors by quickly switching over to (or failing over to) a redundant component when such failures/errors are detected. This is typically requires that the data stored in the elastic databases 704 be replicated, made redundant, or otherwise made durable. In addition, as more components are added or removed from the system 800, the software and/or data (e.g., subscriber data) stored in existing components may require migration or redistribution to or from the added or removed components. As a result, it may become difficult to ascertain or predict the exact locations or components in which specific information is stored. Further, since the logical scalable units (i.e., modules 804) may group/associate an application server node 612 to a specific elastic database 704 component, maintaining the groupings or relationships between each application server node 612 and the data in the databases 704 during data migrations, redistributions and failovers becomes a challenging design criterion.

The various embodiments include methods, and systems and server computing devices configured to implement the methods, of providing telecommunication network services and processing request messages so as to maintain the logical groupings and relationships between applications and their corresponding data/database as new components are added or removed from the telecommunication network, and in the presence of errors or failovers. By maintaining the logical groupings/relationships, the various embodiments may improve the network's performance, responsiveness, predictability, and efficiency, and allow the network to better utilize commodity hardware and/or cloud-based or distributed systems/sub-systems.

In an embodiment, the router 610 component may include a data locality table (DLT) that stores values suitable for use in identifying the component (e.g., logical scalable unit 804, application 612, etc.) in which data associated with the subscriber or group of subscribers is stored. The data locality table may be stored in the router 610 component as an independent table or in association with a surrogate key table. Each router 610 component may store one or more data locality tables for each subscriber, subscriber group, or message type (e.g., Gx, Rx, Gxa, etc.).

The router 610 may use the data locality table to route messages to the component (e.g., logical scalable unit 804, application 612, etc.) associated with the elastic database 704 that stores the relevant data for a subscriber (or group of subscribers) identified in the message. When the system 800 scales or the data is moved to a new component (e.g., logical scalable unit 804), the router 610 component may update the values in the data locality table to reflect changes in the component. In an embodiment, the router 610 component may be configured to poll the elastic databases 704 for such changes/updates. In another embodiment, the elastic database 704 components may be configured to push changes/updates to the router 610 component when the database 704 determines that there have been changes to the database topology.

In an embodiment, the system 800 may include a database proxy architecture (DPA) in which the router 610 component includes a client application programming interface (API) module suitable for use in identifying/locating a specific partition of the elastic database 704 in which data corresponding to a subscriber or group of subscribers is stored. In various embodiments, the client API module may provide or include any or all of the features/functionality provided by existing database client APIs (e.g., VoltDB client API, etc.) that are suitable for use in indentifying data storage locations.

In various embodiments, the router 610 component may use the client API module to route messages to, and store information in, a specific partition/shard of an elastic database 704 that is associated with an application server node 612 tasked with processing that message. The application server node 612 may then pull the relevant data from its associated elastic database 704. In these embodiments, data locality is achieved or improved because the application server node 612 processes requests from its associated elastic database 704 in the same logical scalable unit or module 804 and/or via the use of local or loopback communications. Further, in these embodiments, the elastic database 704 may act as a proxy between the router 610 component and the application server node 612. As such, the database layer is effectively situated between the router layer and the application layer (i.e., due to the information flowing from the router to the database, and then to the application). This logical organization of layers, components and/or functionality may be accomplished in part because the system 800 includes a combined application, database, and storage layer 802. In an embodiment, this combined layer 802 may further include the router 610 component.

In an embodiment, the router 610 component may be configured to perform learning or prediction operations to determine the location of a specific partition/shard of the elastic database 704 in which data corresponding to a subscriber or group of subscribers is stored. For example, the router 610 may monitor the scaling operations in the system 800, and collect heuristics and/or compute statistics regarding the monitored operations, such as the number of logical scalable units (i.e., modules 804) in the system before scale out, the number of logical scalable units or modules 804 in the system after scale out, when the scale out occurred, the duration of the scaling operations, the number of data retrieval misses before and/or after scaling, etc. Based on these heuristics and/or statistic values, the router 610 may predict which data units or data keys have been moved during the scaling operations and/or to which logical scalable units (i.e., modules 804) the data is most likely to have been moved.

Generally, components in a telecommunication network may be responsible for receiving, processing, and communicating many different types of messages and message formats. Not all of these different message types include a unique, common, or uniform identifier (e.g., IP address, etc.) that is suitable for use in identifying a specific database record (e.g., a record for a specific session, subscriber, group of subscribers, etc.). As a result, each component may be required to perform additional operations to determine whether a data record is associated with the same subscriber identified in a message. For these and other reasons, the data may be stored in the databases in association with both a primary key and one or more secondary keys. However, in many horizontally scalable databases (e.g., elastic database 704, etc.), data is shard/partitioned using only the primary key. Consequently, data access times are typically much greater when using a secondary key to locate a database record (i.e., as opposed to the primary key to locate the database record).

The various embodiments include methods, and systems and server computing devices configured to implement the methods, of organizing data in an elastic database so as to reduce the number of secondary key lookups that are required to identify specific data records when reading or writing information to and from a database (e.g., elastic database 704, etc.). In various embodiments, the data may be organized via a single common key method or via an independent key method.

FIGS. 9A-12B illustrate various embodiment methods of processing communication messages in a high-speed, highly available, and elastically scalable telecommunication system. Specifically, FIGS. 9A, 10A, 11A, and 12A illustrate embodiment methods of processing an initial Gx message, and FIGS. 9B, 10B, 11B, and 12B illustrate embodiment methods of processing a subsequent Rx message after the system has been scaled. For ease of reference, these methods are discussed using specific Diameter message formats and terminology. However, it should be understood that such references are for illustrative purposes only, and are not intended to limit the scope of the claims to a particular message type, communication, network or technology unless specifically recited in the claim language.

Figure 9A:
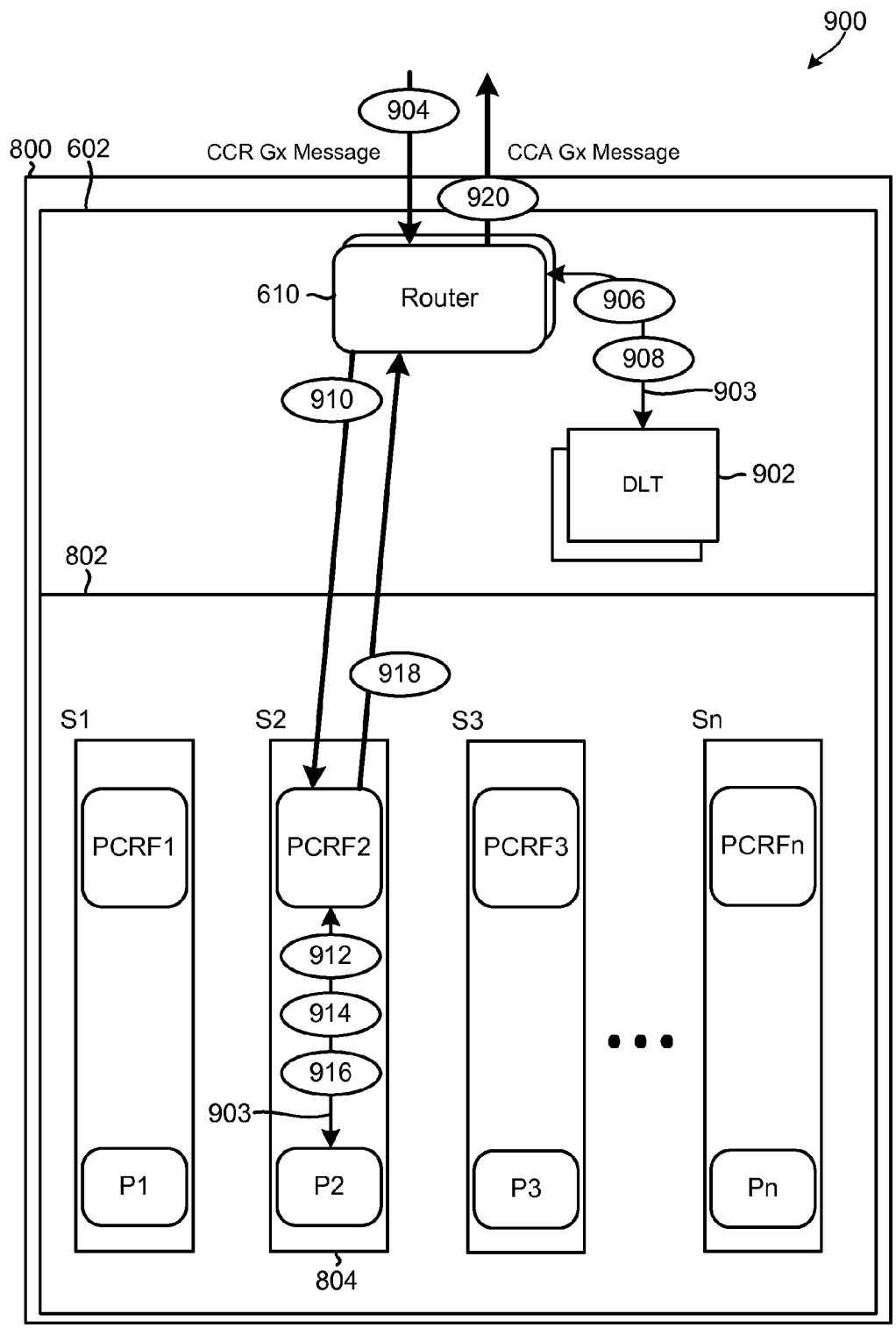
FIG. 9A is a block diagram illustrating the operations and interactions between various components configured to perform an embodiment system method of processing a communication message using a combination of a common key routing method and a data locality table method.

FIG. 9A illustrates an example system method 900 of processing a request message using a combination of a common key routing (CKR) method and a data locality table (DLT) method to achieve data locality and reduce secondary key lookups in accordance with an embodiment. The illustrated system method 900 may be performed by various components (e.g., router, application, etc.) in a high-speed, highly available, elastically scalable telecommunication system 800.

In the example illustrated in FIG. 9A, the system method 900 is performed in system 800 includes a routing layer 602 and a combined application, database, and storage layer 802. The combined layer 802 may include a plurality of logical scalable units or modules (S1-Sn), each of which include an application component (PCRF1-PCRFn) and an elastic database partition (P1-Pn). The routing layer 602 may include a router 610 component that stores, includes, or otherwise has read/write access to a data locality table 902.

In various embodiments, the data locality table 902 may be a table, map, hash table, nested hash table, or similar data structure. The data locality table 902 may store a mapping of key values to the applications (PCRF1-PCRFn) associated with the data or to the logical scalable units (S1-Sn). The data locality table 902 may store a single unique surrogate key (SK) for each subscriber or group of subscribers, and these surrogate keys may be the primary index key to records stored in the data locality table 902.

In an embodiment, the data locality table 902 may be included in a surrogate key table. In another embodiment, the data locality table 902 may include a surrogate key table. In a further embodiment, each of the surrogate key tables may be a hash table. Each logical scalable unit 804 may include multiple data locality tables 902, and each data locality table 902 may be distributed or replicated on multiple logical scalable units 804. Each record in each data locality table 902 may store references to more than one logical scalable unit 804. For example, each record in the data locality table 902 may contain a field identifying the primary application (PCRF1-PCRFn) associated with the data or the logical scalable unit (S1-Sn), a field identifying a secondary application (PCRF1-PCRFn) associated with the data or a logical scalable unit (S1-Sn) that provides rack-level redundancy, and a field identifying a tertiary application (PCRF1-PCRFn) associated with the data or a logical scalable unit (S1-Sn) that provides data centre level redundancy, etc.

In operation 904 of method 900, the router 610 component may receive a Gx CCR-I request message (Request X) that includes a Mobile Subscriber Integrated Services Digital Network Number (MSISDN) field, a Frame-IPAddress (FIA) field (e.g., the IPv4 or IPv6 address associated with the subscriber), and Access-Point-Name (APN) field (e.g., from the Called-Station-ID). The value of the MSISDN field may uniquely identify a subscriber or a group of subscribers, and a combination of the values stored in the FIA and APN fields (herein FIA+APN) may also uniquely identify the subscriber or group.

In operation 906, the router 610 component may access or query the data locality table 902 via a local or loopback communication 903 to determine the location of subscriber data (e.g., SPR, balances, session information, etc.) based on the contents of the received Gx CCR-I request message (Request X), and a generated surrogate key. For example, in operation 906, the router 610 component may use the subscriber identifiers (e.g., MSISDN, FIA+APN) of the received message (Request X) to generate a surrogate key, and use the surrogate key to access the data locality table 902 to determine which of the logical scalable units (S1-Sn) 804 includes an application (PCRF1-PCRFn) associated with information corresponding to a subscriber identified in the received request message (Request X).

In an embodiment, generating the surrogate key may include using the value of the MSISDN field of the received request message (Request X) as the generated surrogate key.

For example, in an embodiment, the unmodified MSISDN value may be used as a surrogate key. In other embodiments, generating the surrogate key may include performing a hash function, algorithm, or operation that includes generating a hash value or code by using the MSISDN value as an input or key to a hash function. For example, if the value of the MSISDN field is "3539876542," the router 610 component may perform hash operations to generate a surrogate key value of "112" (i.e., SK (MSISDN=3539876542)=112). This surrogate key value (i.e., 112) may itself be a key to a bucket or value (e.g., S2 or PCRF 2) of the data locality table 902.

In the example illustrated in FIG. 9A, in operation 906, the router 610 component may use the generated surrogate key (e.g., 112) to retrieve a record from the data locality table that identifies the logical scalable unit (S2) or application component (i.e., PCRF2) associated with the data corresponding to the subscriber identified in the request message (Request X).

In operation 908, the router 610 component may update or insert mappings into a surrogate key table and/or data locality table associated with a different message or message type (e.g., Rx, Gxa, etc.) via a local/loopback communication 903. For example, the router 610 component may update or insert mappings of the FIA+APN value, the generated surrogate key value (e.g., 112), and the determined data location (e.g., S2 or PCRF2) into a surrogate key table associated with an Rx message type. This surrogate key table may be used by the router 610 to locate subscriber data for a subsequent communication message, such as a subsequent Rx Authentication Authorization Request (AAR) message.

In operation 910, the router 610 component may route/send the message (Request X) to an application (PCRF2) in the logical scalable unit or module 804 determined to include the elastic database partition (P2) that stores information (e.g., SPR, balances, session, etc.) corresponding to the subscriber.

In operation 912, the application (PCRF2) may receive the message (Request X), and store information corresponding to the received message (e.g., session information) in the associated elastic database partition (i.e., P2) via a local/loopback communication 903.

In operation 914, the application (PCRF2) may query/request subscriber data (e.g., SPR, balances, session, etc.) from the associated elastic database partition (i.e., P2) via a local/loopback communication 903.

In operation 916, the local elastic database partition (P2) may send the subscriber data to its associated application (i.e., PCRF2) via a local or loopback communication 903.

In operation 918, the application component (PCRF2) may perform various policy and/or charging operations, generate a Credit Control Answer (CCA) Gx response message, and send the generated CCA Gx message to the router 610 component.

In operation 920, the router 610 component may receive and route the CCA Gx message to the appropriate component or system in the telecommunication network.

The performance of system method 900 by the various components (e.g., router, applications, etc.) in the system 800 improves the system's 800 overall efficiency and responsiveness by reducing the number of synchronous remote communications that must be performed when processing communication messages. For example, when implementing system method 900, the system 800 only incurs a performance penalty of four (4) remote synchronous communications (in operations 904, 910, 918, and 920) when processing a Gx request message. Since local/loopback communications are much less expensive than remote synchronous communications, configuring the components to perform system method 900 improves the performance, efficiency, and responsiveness of the entire system 800.

The performance of system method 900 may include the use of a common key routing method, which may allow all of the session information related to a common key to be stored in a single entry in the session store. This in turn allows the system method 900 to be performed by components in a system that includes elastically scalable No-SQL databases.

Figure 9B:
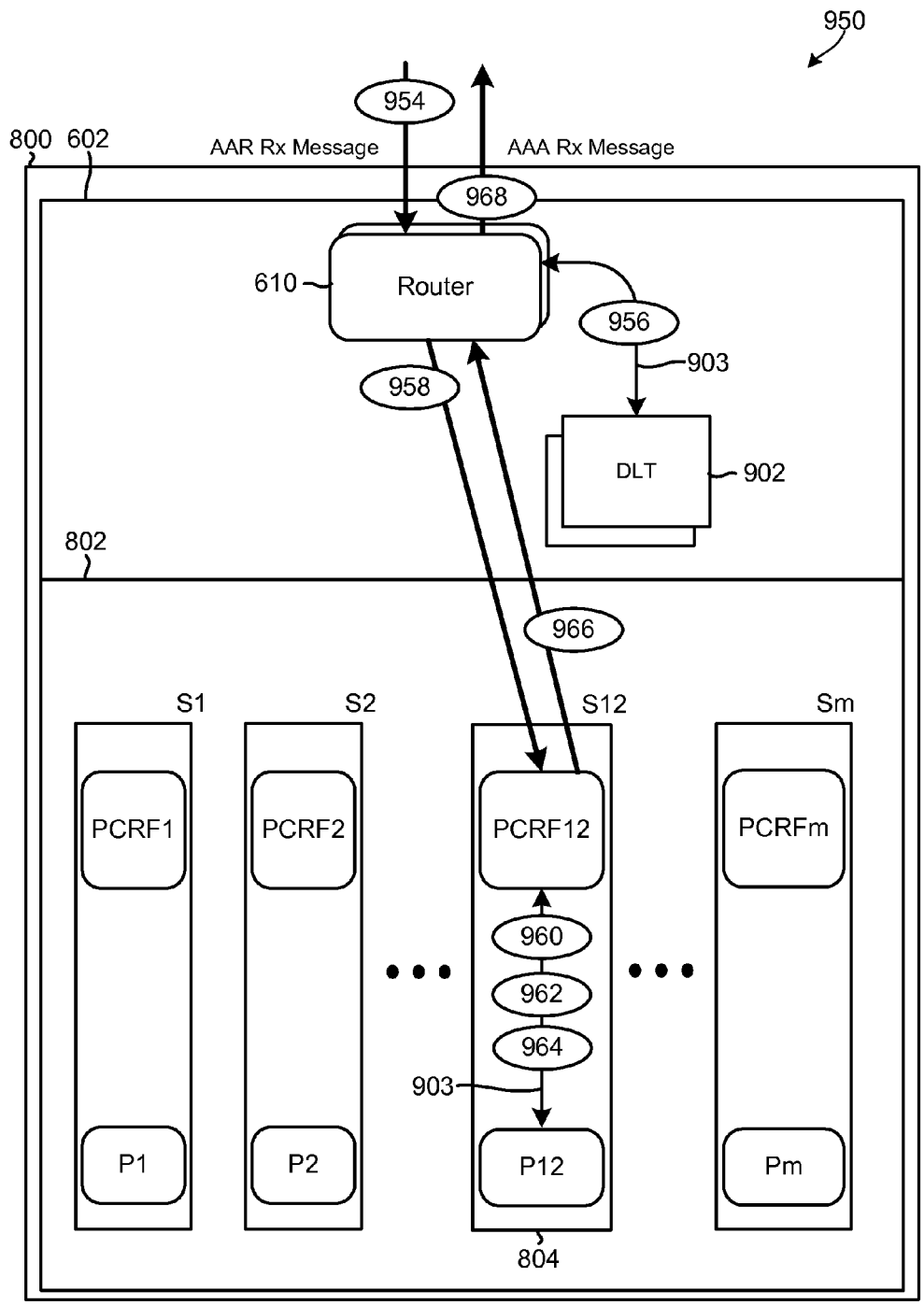
FIG. 9B is a block diagram illustrating the operations and interactions between various components configured to perform an embodiment system method of processing a second communication message using a combination of a common key routing method and a data locality table method.

FIG. 9B illustrates another example system method 950 of processing a request message using a combination of a common key routing (CKR) method and a data locality table (DLT) method. System method 950 may be performed by components in the system 800 after the performance of the system method 900 illustrated in FIG. 9A, after the system 800 has been scaled, and in response to the router 610 component receiving a subsequent request message (e.g., Rx AAR request message). More specifically, in the example illustrated in FIG. 9B, the system method 950 is performed after the logical scalable units have been scaled to include Sm logical scalable units (where Sm is greater than Sn), the subscriber data previously stored in the in the second partition (P2) contained in the second logical scalable unit (S2) has been moved to the twelfth partition (P12) contained in the twelfth logical scalable unit (S12), and the data locality table 902 and surrogate keys have been updated to reflect the new data locations (S12 or PCRF12).

In operation 954 of method 950, the router 610 component may receive an Rx AAR message for a new Rx session (Request Y) that includes FIA+APN field that identifies a subscriber (or group of subscribers) and/or a session identifier. That is, in operation 954 the router 610 component may receive a communication message that identifies the subscriber/session via a different field, value, or identifier as that which is used by the communication message (Request X) received in operation 904 of method 900.

In operation 956 of method 950, the router 610 component may query a data locality table 902 via local or loopback communications 903. For example, the router 610 component may use the FIA+APN value to retrieve the common surrogate key, and use the common surrogate key to retrieve a record from the data locality table 902, and determine which of the logical scalable units (S1-Sm) 804 includes an application (PRF1-PCRFm) that is associated with information corresponding to the subscriber identified in the received message (Request Y) based on the retrieved record. Since, in this example, the data locality table 902 has been updated after the scaling operations, querying data locality table 902 using the common surrogate key (112) will return a data location of "S12" or "PCRF12".

In operation 958, the router 610 component may route/send the Rx AAR-I request message (Request Y) to the application (PCRF 12) in the logical scalable unit or module 804 determined to be associated with the elastic database partition (P12) that stores information corresponding to the subscriber identified in the request message (Request Y). Alternatively, the router 610 component may generate a new communication message based on information included in the Rx AAR-I request message (Request Y), and send this new communication message to the application (PCRF 12).

In operation 960, the application (PCRF12) may receive the message (Request Y), and store information corresponding to the received message (e.g., session information) in the corresponding elastic database partition (P12) via a local or loopback communication 903.

In operation 962, the application may query/request subscriber data (e.g., SPR, balances, session, etc.) from its associated elastic database partition (P12) via a local or loopback communication 903.

In operation 964, the elastic database partition (P12) may send the subscriber data to the application (PCRF 12) via a local or loopback communication 903.

In operation 966, the application (PCRF2) may perform various policy and/or charging operations, generate an Authentication Authorization Answer (AAA) Rx message, and send the generated AAA Rx message to the router 610 component.

In operation 968, the router 610 component may route the AAA Rx message to the appropriate component or system in the telecommunication network.

Configuring the various components (e.g., router, database, application, etc.) to perform system method 950 improves the system's 800 overall efficiency and responsiveness by reducing the number of synchronous remote communications that must be performed when processing communication messages. For example, when implementing system method 950, the system 800 only incurs a performance penalty of four (4) remote synchronous communications (i.e., in operations 954, 958, 966, and 968). All other communication and interactions between the components are accomplished via local or loopback communications. Since such local/loopback communications are faster and less expensive than remote synchronous communications, configuring the components to perform system method 950 improves the performance, efficiency and responsiveness of the entire system 800.

Figure 10A:
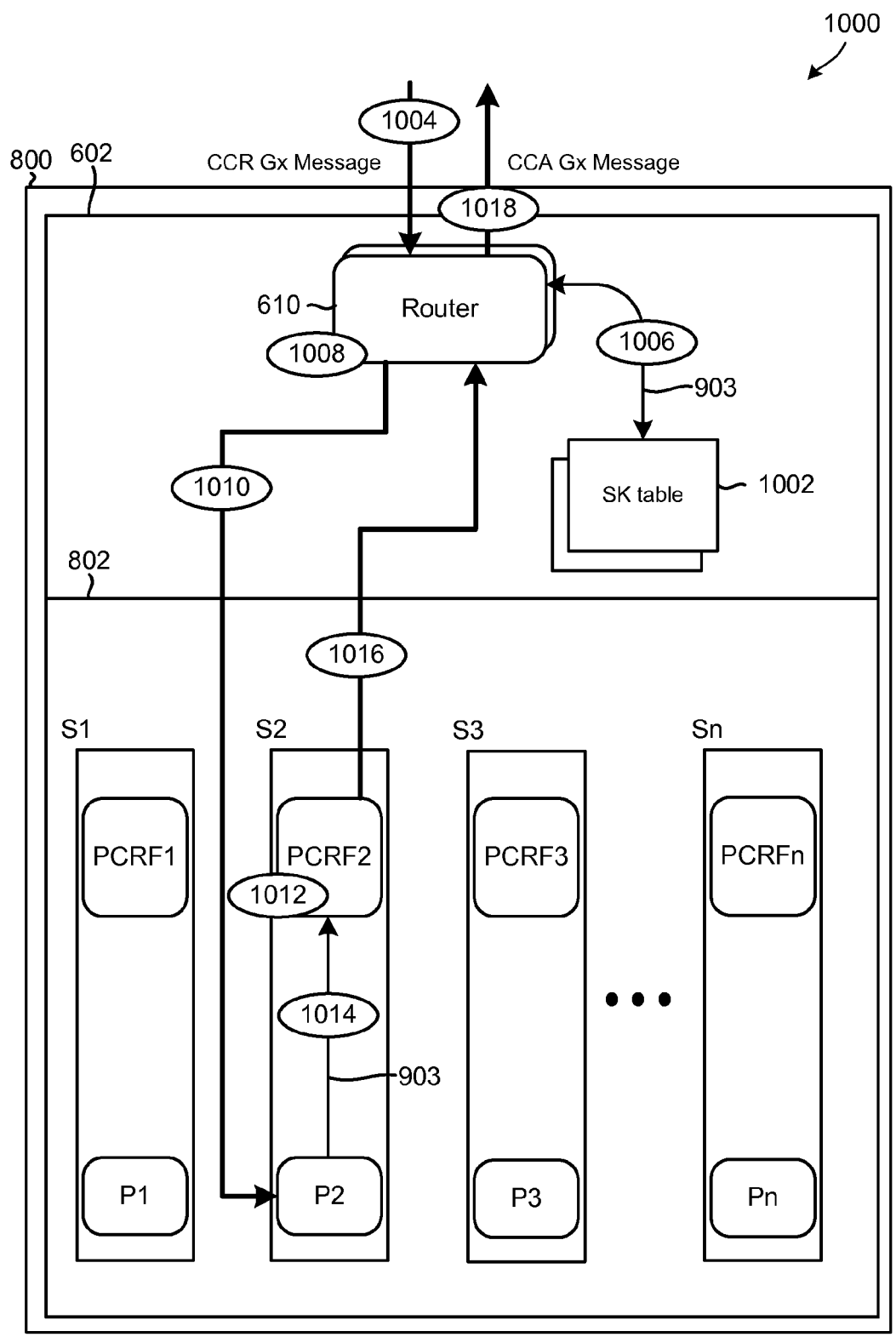
FIG. 10A is a block diagram illustrating the operations and interactions between various components configured to perform an embodiment system method of processing a communication message using a combination of a common key routing method and a database proxy architecture method.

FIG. 10A illustrates an example system method 1000 of processing a request message using a combination of a common key routing (CKR) method and a database proxy architecture (DPA) method to achieve data locality and reduce secondary key lookups in accordance with an embodiment. The system method 1000 may be performed by components in a system 800 having a combined layer 802 that includes a plurality of logical scalable units or modules 804 (S1-Sn), each of which includes an application (PCRF1-PCRFn) and an elastic database partition (P1-Pn). The router 610 component includes a client API module (not illustrated) configured to identify an elastic database partition (P1-Pn) that stores a particular database record based on a key value. The client API module may also include a database API that allows the router component to read and write information in the elastic database partitions (P1-Pn). In various embodiments, the router 610 component may be in a routing layer 602 or in the combined layer 802.

In operation 1004 of method 1000, the router 610 component may receive a Gx CCR-I request message (Request X) that includes all the identifiers (e.g., MSISDN, FIA+APN, etc.). In operation 1006, the router 610 component may use the value of the FIA+APN field to generate a surrogate key (e.g., via a hash operation), and store a mapping of the FIA+APN value to the generated surrogate key in an "Rx message SK table" 1002 via a local or loopback communication 903.

In operation 1008, the router 610 component may identify (e.g., via the client API module) the elastic database partition (P2) that is associated with an application (PCRF 2) tasked with processing the Gx request message (Request X) and/or which stores subscriber data suitable for use in processing the Gx request message (Request X). The router 610 component may identify the correct database partition (P2) using the generated surrogate key.

In operation 1010, the router 610 component may store (e.g., via the client API module) the Gx request message (Request X) in the identified elastic database partition (P2). In an embodiment, the router 610 component may also store the generated surrogate key in the identified elastic database partition (P2). In an embodiment, the router 610 component may store the generated surrogate key as a primary index key to the database record that includes the Gx request message (Request X).

In operation 1012, the application (PCRF 2) may poll a local request table, retrieve the next request in the request table for processing, and process the retrieved request. In an embodiment, operation 1012 may be performed concurrently with operation 1010. That is, the application (PCRF 2) may continue to process other request messages while information is being written to its associated database partition (P2).

In operation 1014, the application (PCRF 2) polls the local request table, determines that the next message in the local request table is the Gx request message (Request X), and pulls the Gx request message (Request X) and subscriber data from its associated elastic database partition (P2) via local/loopback communications 903.

In operation 1016, the application (PCRF 2) may perform various policy and/or charging operations based on the retrieved subscriber data/message, generate a CCA Gx message, and send the generated CCA Gx message to the router 610 component.

In operation 1018, the router 610 component may route the CCA Gx message to the appropriate component or system in the telecommunication network.

Configuring the various components (e.g., router, database, application, etc.) to perform system method 1000 improves the efficiency and responsiveness of the telecommunication system 800 by reducing the number of remote synchronous communications or hops that are performed when processing a Gx request message (Request X). For example, when implementing system method 1000, the system 800 only incurs a performance penalty of four (4) remote synchronous communications (i.e., in operations 1004, 1010, 1016, and 1018). Further, system method 1000 is an asynchronous message routing solution since the router does not communicate directly with the applications, and is therefore not required to block or wait for response messages from the application components. This allows these components to perform certain operations concurrently or in parallel to further improve the speed and efficiency of the system 800.

In addition, the performance of system method 1000 does not require that the system 800 include a data locality table and/or maintain data storage locations in a routing layer component. Rather, the router 610 component may use the generated surrogate key and client API module to insert the request messages directly into the correct elastic database partition.

Figure 10B:
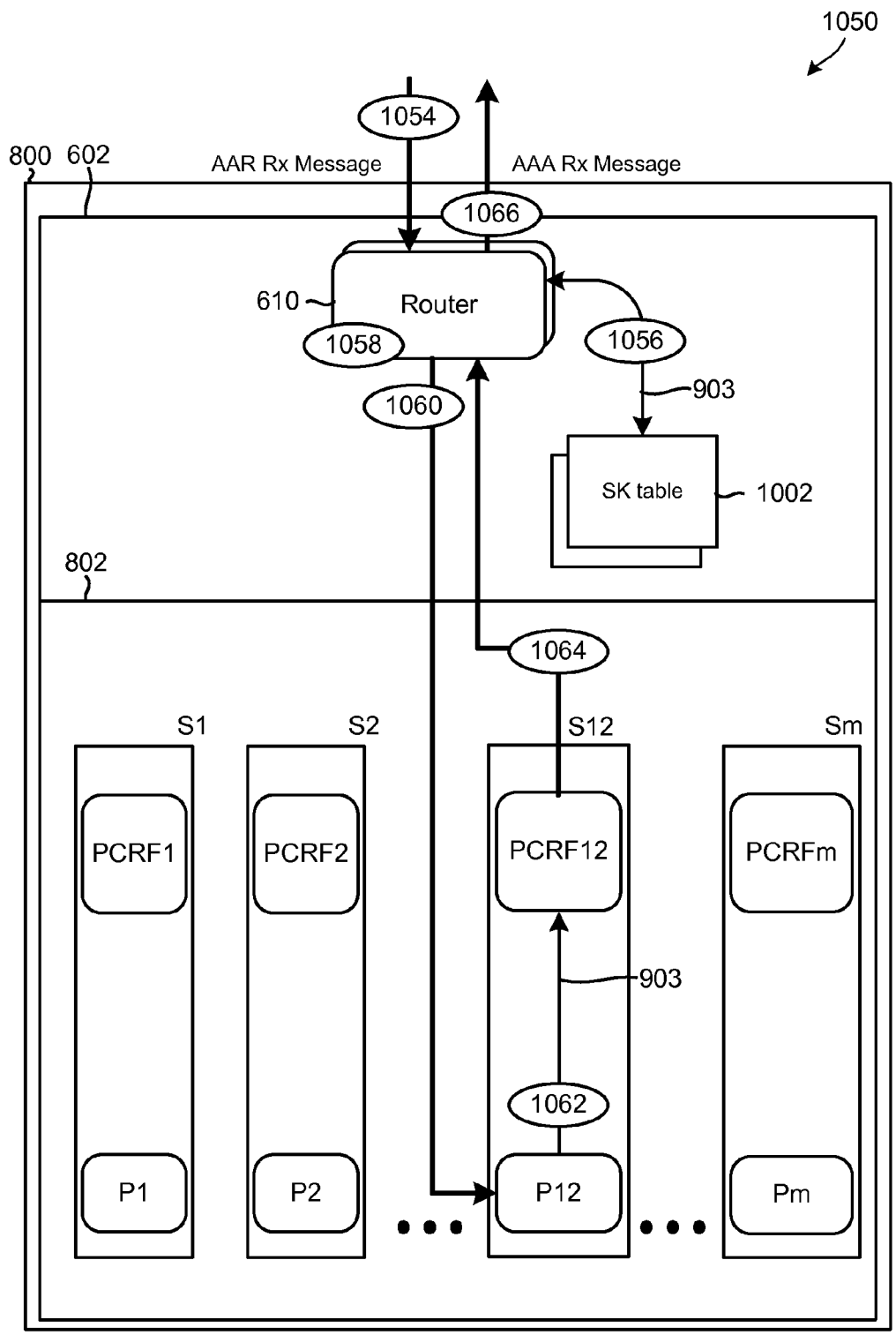
FIG. 10B is a block diagram illustrating the operations and interactions between various components configured to perform an embodiment system method of processing a second communication message using a combination of a common key routing method and a database proxy architecture method.

FIG. 10B illustrates another example system method 1050 of processing a request message using a combination of a common key routing (CKR) method and a database proxy architecture (DPA) method to achieve data locality and reduce secondary key lookups. System method 1050 may be performed by components in the system 800 after the performance of the system method 1000 illustrated in FIG. 10A, after the system 800 has been scaled so that the subscriber data previously stored in the second partition (P2) has been moved to the twelfth partition (P12).

In operation 1054, the router 610 component may receive an Rx AAR-I request message (Request Y) that includes FIA+APN field identifying the subscriber (or group of subscribers). That is, in operation 1054 the router 610 component may receive a communication message that identifies the subscriber via a different field, value, or identifier as that which is used by the communication message (Request X) received in operation 1004 of method 1000.

In operation 1056, the router 610 component may use the value of the FIA+APN field to retrieve the common surrogate key from the "Rx message SK table" 1002 via a local or loopback communication 903.

In operation 1058, the router 610 component may use the common surrogate key to identify (i.e., via the client API module) the elastic database partition (P12) that is associated with an application (PCRF 12) tasked with processing the request message (Request Y) and/or which stores information corresponding to the subscriber identified in the request message (Request Y). In operation 1060, the router 610 component may store the request message (Request Y) in the identified elastic database partition (P12) via the client API module.

In operation 1062, the application (PCRF 12) may poll a local request table, determine that the next message in the local request table is the Rx request message (Request Y), and pull the Rx message (Request Y) and/or subscriber data from the associated elastic database partition (P12) via local/loopback communications 903. In operation 1064, the application (PCRF 12) may process the Rx message (Request Y) by performing various policy and/or charging operations, generate an AAA Rx message, and send the generated AAA Rx message to the router 610 component. In operation 1066, the router 610 component may route the AAA Rx message to the appropriate component or system in the telecommunication network.

Configuring the various components (e.g., router, database, application, etc.) to perform system method 1050 improves the efficiency and responsiveness of the telecommunication system 800 by reducing the number of remote synchronous communications or hops that are performed when processing communication message (Request Y). For example, when implementing system method 1050, the system 800 only incurs a performance penalty of four (4) remote synchronous communications (i.e., in operations 1054, 1060, 1064, and 1066). Further, the performance of system method 1050 does not require that the system 800 include a data locality table and/or maintain data storage locations in a routing layer component. Rather, the router 610 component may use the common surrogate key and client API module to insert the request messages directly into the correct database partitions. In addition, system method 1050 is an asynchronous message routing solution since the router component does not communicate directly with the application components, and is therefore not required to block or wait for response messages from the application components.

Figure 11A:
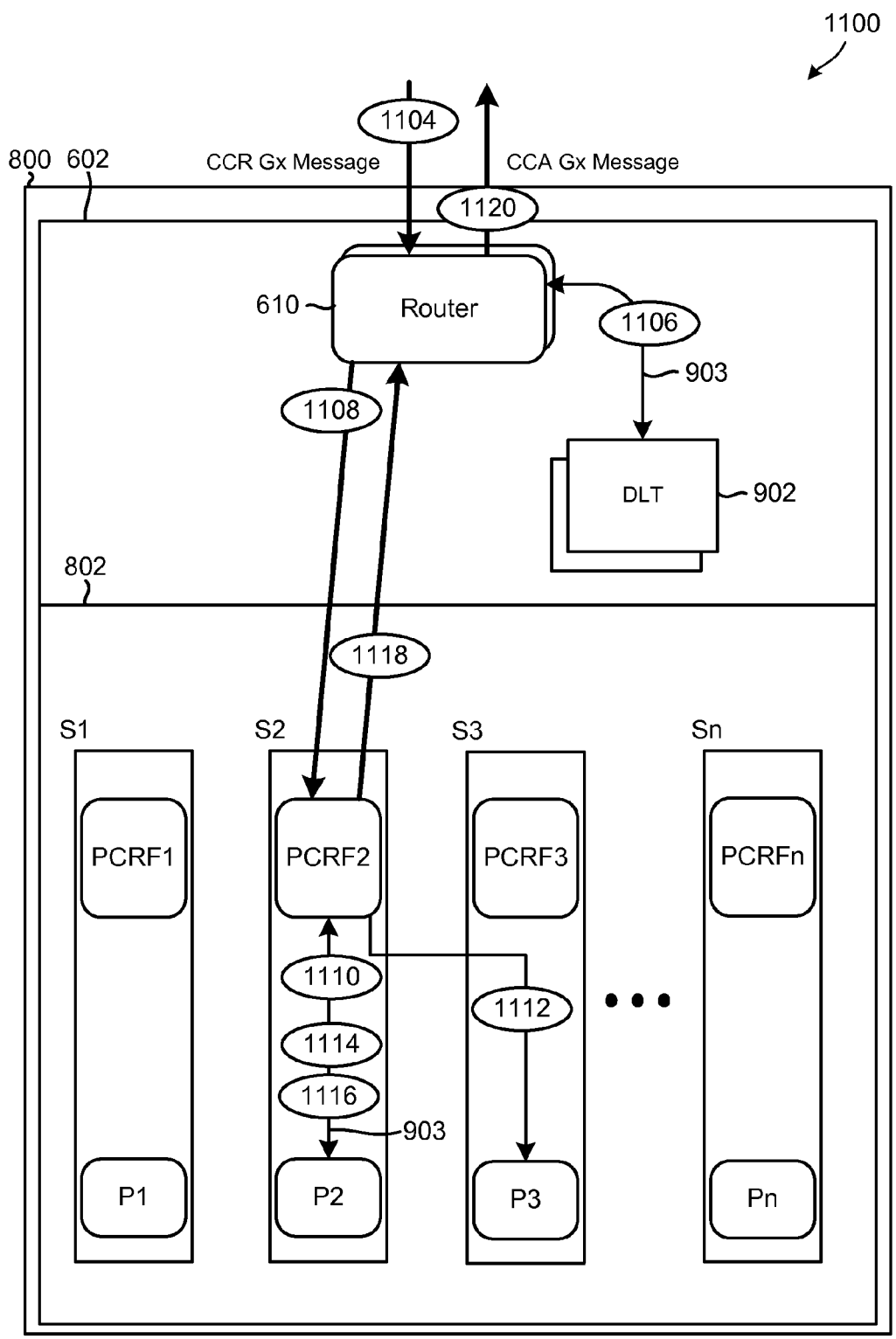
FIG. 11A is a block diagram illustrating the operations and interactions between various components configured to perform an embodiment system method of processing a communication message using a combination of an independent key routing method and a data locality table method.

FIG. 11A illustrates an example system method 1100 of processing a request message using a combination of an independent key routing (IKR) method and a data locality table (DLT) method to reduce secondary key lookups in accordance with an embodiment. System method 1100 may be performed by components in a high-speed, highly available, elastically scalable telecommunication system 800 in which subscriber data for a single subscriber (or a single group of subscribers) is partitioned across multiple database partitions (P1-Pn).

In the illustrated example of FIG. 11A, the system 800 includes a router 610 component that stores, includes, or otherwise has read/write access to a data locality table 902. The data locality table 902 may store information suitable for identifying one or more logical scalable units associated with information (e.g., SPR, balances, session, etc.) corresponding to a single subscriber (or a single group of subscribers). For example, the data locality table 902 may store information suitable for identifying a first logical scalable unit (e.g., S2) that includes a Gx session store associated with a subscriber and a second logical scalable unit (e.g., S3) that includes an Rx session store associated with the same subscriber. In addition, the router 610 component may be included in the combined layer 802 and/or the data locality table 902 may be replicated or otherwise made accessible to the application components (PCRF1-*n*).

In operation 1104 of method 1100, the router 610 component may receive a Gx CCR-I request message (Request X) that includes all the identifiers for a subscriber (e.g., MSISDN, FIA+APN, etc), and generate a plurality of surrogate keys.

In an embodiment, the router 610 component may generate a surrogate key value for each of a plurality of message types (e.g., Gx, Rx, etc.) based on the subscriber identifying values (e.g., MSISDN, FIA+APN, etc.) included in the received Gx request message (Request X). For example, the router 610 component may generate a Gx surrogate key value (SKGx) using the MSISDN value of the received message (Request X), and an Rx surrogate key value (SKRx) using the FIA+APN value of the received message (Request X). In an embodiment, the router 610 component may generate the SKGx and SKRx values so that no two SKRx values are the same, and so that no two SKGx values are the same.

In an embodiment, the router 610 component may generate the surrogate key values (e.g., SKGx, SKRx, etc.) by performing hash operations to functions. In this embodiment, the performance of method 1100 is not contingent on the system 800 including a single or centralized surrogate key table. By eliminating the requirement for and/or the use of a single surrogate key table, system method 1100 may reduce the potential for race conditions, contention issues, or other database errors occurring in the system 800 when processing/routing the communication message (Request X).

In operation 1106, the router 610 component may access or query the data locality table 902 via a local or loopback communication 903, using the generated Gx surrogate key value (SKGx) to retrieve a record identifying a logical scalable unit (S2) or application (PCRF2) that is associated with an elastic database partition (P2) that includes the Gx session store/memory associated with the subscriber identified in the received Gx request message (Request X).

In operation 1108, the router 610 component may send the Gx request message (Request X) and the generated surrogate keys (SKGx and SKRx) to the identified application (PCRF 2).

In operation 1110, the application (PCRF 2) may store the received Gx request message (Request X) in the associated partition (P2) via a local/loopback communication 903.

In operation 1112, the application (PCRF 2) may use the Rx surrogate key (SKRx) to identify the elastic database partition (i.e., P3) that includes the Rx session store/memory, and store the received Gx surrogate key (SKGx) as a record in the Rx session store/memory of the identified partition (P3).

In operation 1114, the application (PCRF 2) may query the associated partition (P2) for subscriber data, including SPR and balance information, via a local/loopback communication 903. In an embodiment, operations 1112 and 1114 may be performed concurrently.

In operation 1116, the elastic database partition (P2) may send the requested subscriber information (e.g., SPR and balance information) to its associated application (PCRF 2) via a local/loopback communication 903. In an embodiment, operations 1112 and 1116 may be performed concurrently.

In operation 1118, the application (PCRF 2) may receive subscriber data from its associated elastic database partition (P2), process the request message (Request X) by performing various policy and/or charging operations, generate a new message (e.g., CCA Gx message) and send the generated message to the router 610 component. In an embodiment, operations 1112 and 1118 may be performed concurrently.

In operation 1120, the router 610 component may receive and route the message (e.g., CCA Gx message) to the appropriate component or system in the telecommunication network.

The performance of system method 1100 by the various components (e.g., router, applications, etc.) in the telecommunication system 800 improves the system's 800 overall efficiency and responsiveness by reducing the number of synchronous remote communications that must be performed when processing communication messages (e.g., Request X). For example, when implementing system method 1100, the system 800 only incurs a performance penalty of four (4) remote synchronous communications (i.e., in operations 1104, 1108, 1118, and 1120) when processing a Gx request message. Since local/loopback communications are much less expensive than remote synchronous communications, configuring the components to perform system method 1100 improves the performance, efficiency, and responsiveness of the entire system 800.

Further, when routing messages using system method 1100, certain database read/write operations (e.g., operation 1112) may be performed in parallel with the message processing or generation operations (e.g., operation 1118), which further improves the speed and efficiency of the system 800.

In addition, when performing system method 1100, the system 800 does not experience any of the latencies typically associated with writing information to a centralized surrogate key tables, and these tables cannot become a point of contention or a source of database errors when the routing layer is scaled or additional routers are included in the system 800.

Figure 11B:
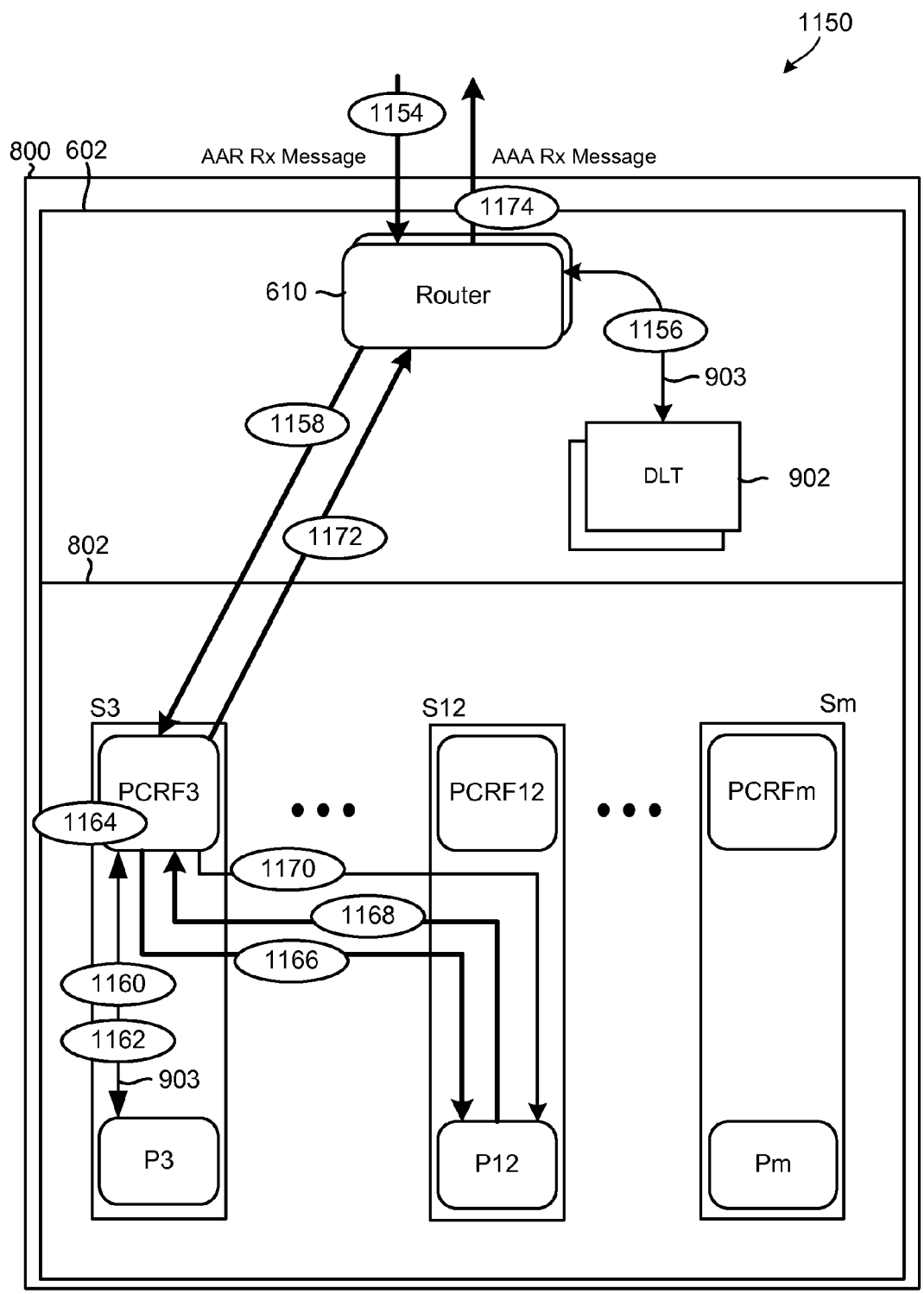
FIG. 11B is a block diagram illustrating the operations and interactions between various components configured to perform an embodiment system method of processing a second communication message using a combination of an independent key routing method and a data locality table method.

FIG. 11B illustrates another example system method 1150 of processing a request message using a combination of an independent key routing (IKR) method and a data locality table (DLT) method to reduce the number of secondary key lookups. System method 1150 may be performed by components in the system 800 after the performance of the system method 1100 illustrated in FIG. 11A, after the system 800 has been scaled so that the subscriber data previously stored in the second partition (P2) contained in the second logical scalable unit (S2) has been moved to the twelfth partition (P12) contained in the twelfth logical scalable unit (S12), and after the data locality table 902 has been updated to reflect the new data locations for the Gx session stores (S12 or P12).

In operation 1154, the router 610 component may receive an AAR Rx request message (Request Y) that includes FIA+APN field, and generate a surrogate key based on the value of the FIA+APN field.

In operation 1156, the router 610 component may query the data locality table 902 via a local or loopback communication 903, using the generated surrogate key to retrieve a record identifying the logical scalable unit (S3) that includes the Rx session store that is associated with the subscriber identified in the received Rx request message (Request Y).

In operation 1158, the router 610 component may send the Rx request message (Request Y) to the application (PCRF3) associated with the identified logical scalable unit (S3).

In operation 1160, the application (PCRF3) may store the Rx request message (Request Y) in its associated partition (P3) via a local/loopback communication 903.

In operation 1162, the application (PCRF3) may retrieve/pull the Gx surrogate key (SKGx) (which was stored as part of performance of operation 1112) and Rx session information from the Rx session store of its associated elastic database partition (P3) via a local/loopback communication 903.

In operation 1164, the application (PCRF3) may use the retrieved Gx surrogate key (SKGx) to identify the database partition (P12) to which the Gx session store of the subscriber identified in the Rx request message (Request Y) was moved during the scaling operations. This may be accomplished by the application component (PCRF3) accessing a local data locality table or using a local client API module, similar to that which is described above with reference to the router 610 component.

In operation 1166, the application (PCRF3) may query the Gx session store in the database partition (P12) that includes the Gx session store and/or subscriber data (e.g., SPR and balances).

In operation 1168, the application (PCRF3) may receive subscriber data from the identified database partition (P12).

In operation 1170, the application (PCRF3) may store updated information in the Gx session store in the identified database partition (P12).

In operation 1172, the application (PCRF3) may process the request message (Request Y) using the subscriber data received from the identified database partition (P12), perform various policy and/or charging operations, generate an AAA Rx message, and send the generated AAA Rx message to the router 610 component. In an embodiment, operations 1170 and 1172 may be performed concurrently or in parallel.

In operation 1174, the router 610 component may route the AAA Rx message to the appropriate component or system in the telecommunication network.

The performance of system method 1150 by the various components (e.g., router, applications, etc.) in the telecommunication system 800 improves the system's 800 overall efficiency and responsiveness by reducing the number of synchronous remote communications that must be performed when processing communication messages (e.g., Request Y). For example, when implementing system method 1150, the system 800 only incurs a performance penalty of six (6) remote synchronous communications (i.e., in operations 1154, 1158, 1166, 1168, 1172, and 1174) when processing an Rx request message.

Further, in system method 1150, certain database read/write operations (e.g., operation 1170) may be performed in parallel with the message processing or generation operations (e.g., operation 1172), which improves the speed and efficiency of the system 800.

In addition, when performing system method 1150, the system 800 does not experience any of the latencies typically associated with writing information to a centralized surrogate key tables, and these tables cannot become a point of contention or a source of database errors when the routing layer is scaled or additional routers are included in the system 800.

Figure 12A:
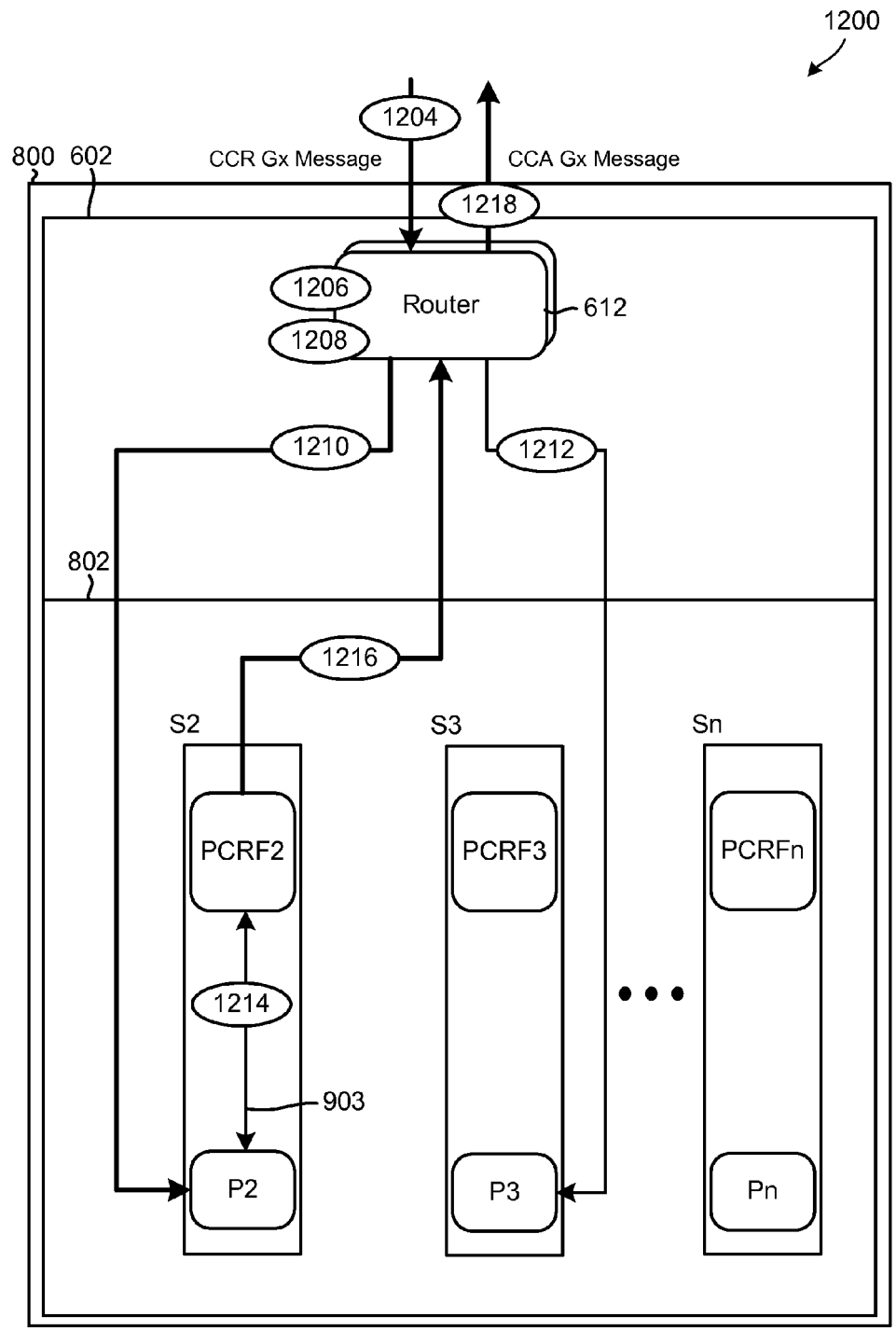
FIG. 12A is a block diagram illustrating the operations and interactions between various components configured to perform an embodiment system method of processing a communication message using a combination of an independent key routing method and a database proxy architecture method.

FIG. 12A illustrates an example system method 1200 of processing a request message using a combination of an independent key routing (IKR) method and a database proxy architecture (DPA) method to reduce secondary key lookups in accordance with an embodiment. System method 1200 may be performed by components in a high-speed, highly available, elastically scalable telecommunication system 800 in which subscriber data for a single subscriber (or a single group of subscribers) is partitioned across multiple database partitions (P1-Pn). The system 800 may also include a router 610 component having a client API (not illustrated) configured to identify an elastic database partition (P1-Pn) that stores a particular database record based on a key value. The client API module may also include a database API that allows the router component to read and write information in the elastic database partitions (P1-Pn). In various embodiments, the router 610 component may be in a routing layer 602 or in the combined layer 802.

In operation 1204 of method 1200, the router 610 component may receive a Gx CCR-I request message (Request X) that includes a MSISDN field and a FIA+APN field.

In operation 1206, the router 610 component may generate a Gx surrogate key value (SKGx) using the MSISDN value and an Rx surrogate key value (SKRx) using the FIA+APN value. In an embodiment, the router 610 component may be configured to generate the SKGx and SKRx values so that no two SKRx values are the same, and so no two SKGx values are the same.

In operation 1208, the router 610 component may identify (e.g., via the client API module) a first elastic database partition (P2) that is associated with a application (PCRF 2) tasked with processing the request message (Request X) and/or which stores information (e.g., subscriber data) needed to process the request message (Request X). Also in operation 1208, the router 610 component may identify (e.g., via the client API module) a second elastic database partition (P3) that includes an Rx session store for the subscriber.

In operation 1210, the router 610 component may store the Gx request message (Request X) and the Gx surrogate key (SKGx) in the first elastic database partition (P2) via the client API module.

In operation 1212, the router 610 component may store the Gx surrogate key (SKGx) in the second elastic database partition (P3). In an embodiment, operations 1210 and 1212 may be performed concurrently.

In operation 1214, the application (PCRF 2) associated with the first elastic database partition (P2) may retrieve/pull the request message (Request X) and subscriber data (e.g., SPR, balance, etc.) from its associated elastic database partition (P2) via a local/loopback communication 903. In an embodiment, if the application component (PCRF 2) determines that there is a shared balance, the application (PCRF 2) may generate a hash for the shared balance, use the generated hash to locate the remote database partition that stores relevant subscriber data, and pull the subscriber data (e.g., balance information) from the remote database partition.

In operation 1216, the application (PCRF 2) associated with the first elastic database partition (P2) may process the request message (Request X), perform various policy and/or charging operations using the subscriber data, generate an CCA Gx message, and send the generated CCA Gx message to the router 610 component.

In operation 1218, the router 610 component may receive and route the message (e.g., CCA Gx message) to the appropriate component or system in the telecommunication network.

Configuring the various components (e.g., router, database, application, etc.) to perform system method 1200 improves the efficiency and responsiveness of the telecommunication system 800 by reducing the number of remote synchronous communications or hops that are performed when processing a communication message (e.g., Request X). For example, when implementing system method 1200, the system 800 only incurs a performance penalty of four (4) remote synchronous communications (i.e., in operations 1204, 1210, 1216, and 1218) when processing a Gx message.

Further, the performance of system method 1200 does not require that the system 800 include a data locality table and/or maintain data storage locations in a routing layer component. Rather, the router 610 component may use the Rx and Gx surrogate keys and client API module to insert the information directly into the elastic database partitions.

Figure 12B:
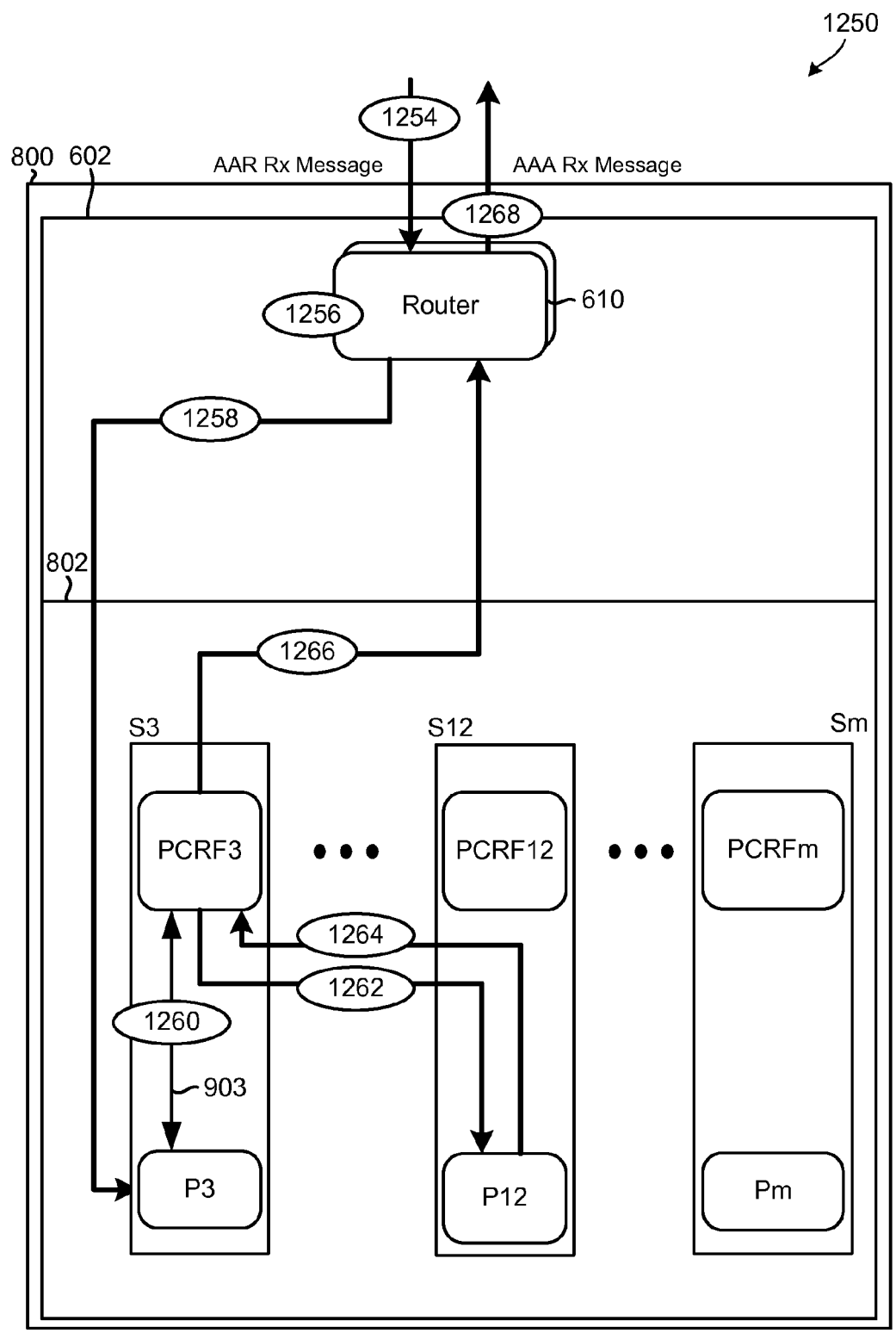
FIG. 12B is a block diagram illustrating the operations and interactions between various components configured to perform an embodiment system method of processing a second communication message using an independent key routing method and a database proxy architecture method.

FIG. 12B illustrates another example system method 1250 of processing a request message using an independent key routing (IKR) method and a database proxy architecture (DPA) method to reduce secondary key lookups. System method 1250 may be performed by components in the system 800 after the performance of the system method 1200 illustrated in FIG. 12A, after the system 800 has been scaled so that the subscriber data previously stored in the second partition (P2) has been moved to the twelfth partition (P12).

In operation 1254, the router 610 component may receive an Rx AAR-I request message (Request Y) that includes FIA+APN field.

In operation 1256, the router 610 component may use the value of the FIA+APN field to generate an Rx surrogate key (SKRx).

In operation 1258, the router 610 component may use the client API (not illustrated) to identify the elastic database partition (P3) that includes an Rx session store for the subscriber, and store the request message (Request Y) and generated Rx surrogate key (SKRx) in the identified database partition (P3).

In operation 1260, the application (PCRF 3) associated with the database partition (P3) may retrieve/pull the Rx request message (Request Y) and Gx surrogate key (SKGx) value from the database partition (P3) via local/loopback communications 903.

In operation 1262, the application (PCRF 3) may use the Gx surrogate key (SKGx) value to identify the elastic database partition (P12) to which the subscriber data was moved during the scaling operations, and request a Gx session data and subscriber data (e.g., SPR, balance information, etc.) from the database partition (P12).

In operation 1264, the application (PCRF 3) may receive the Gx session data and subscriber data from the database partition (P12).

In operation 1266, the application (PCRF 3) may use the subscriber data to process the request message (Request Y) by performing various policy and/or charging operations, generate an AAA Rx message, and send the generated AAA Rx message and a Gx Re-Authorization Request (RAR) to the router 610 component.

In operation 1268, the router 610 component may receive and route the AAA Rx message to the appropriate component or system in the telecommunication network.

Configuring the various components (e.g., router, database, application, etc.) to perform system method 1250 improves the efficiency and responsiveness of the telecommunication system 800 by reducing the number of remote synchronous communications or hops that are performed when processing an Rx request message (Request Y). For example, when implementing system method 1250, the system 800 only incurs a performance penalty of six (6) remote synchronous communications (i.e., in operations 1254, 1258, 1262, 1264, 1266, and 1268).

Further, the performance of system method 1250 does require that the system 800 include a data locality table and/or maintain data storage locations in a routing layer component. Rather, the router 610 component may use the Rx and Gx surrogate keys and client API module to insert the information directly into the correct elastic database partitions.

Figure 13:
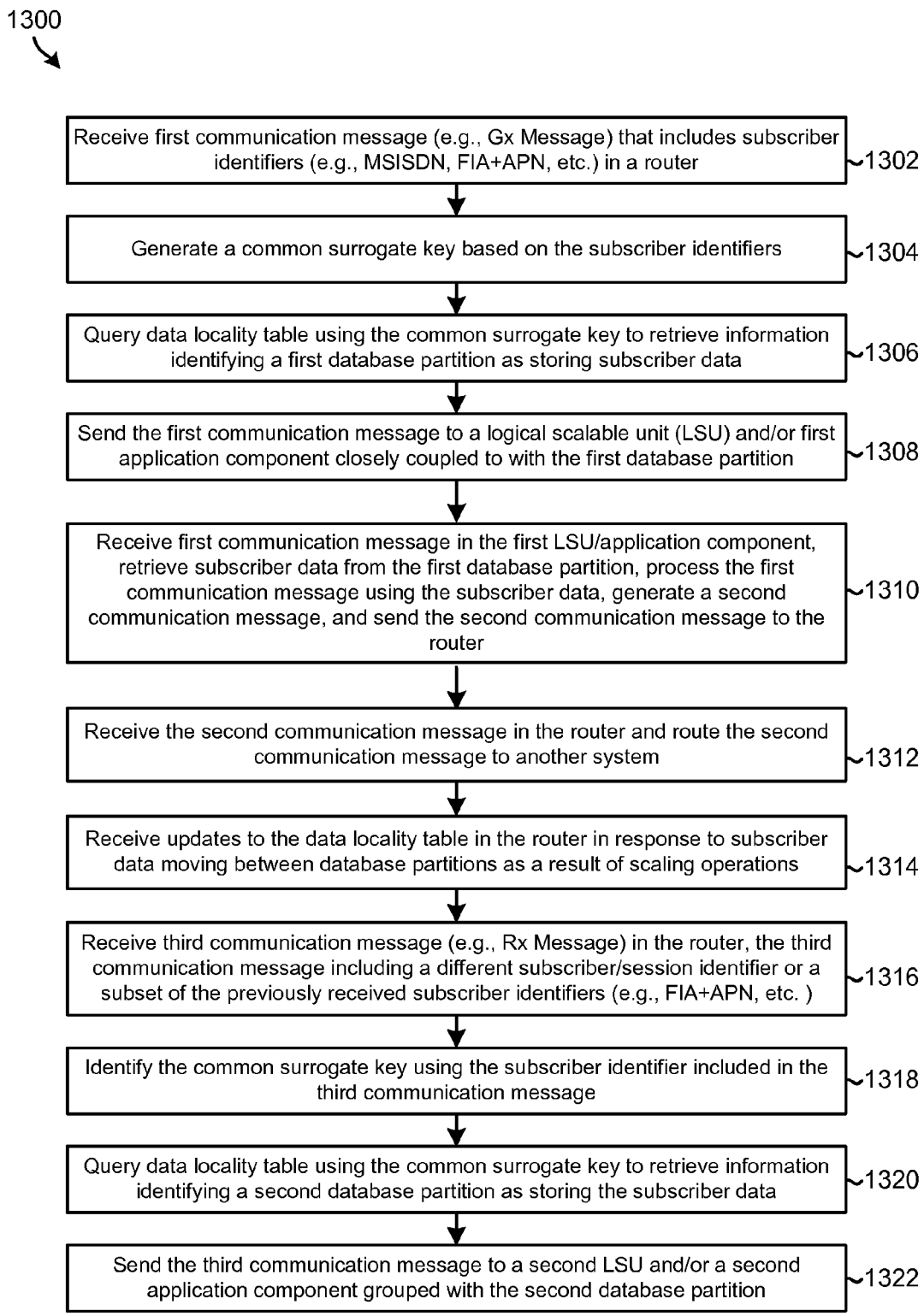
FIG. 13 is a process flow chart illustrating an embodiment common key routing and data locality table (CKR-DLT) method of processing communication messages.

FIG. 13 illustrates an embodiment CKR-DLT method 1300 of processing a request message. The CKR-DLT method 1300 may be performed by components (e.g., server computing devices, processors, processes, etc.) in a high-speed, highly available, elastically scalable telecommunication system 800.

In block 1302, a router processor in a multiprocessor computing system may receive a first communication message (e.g., Gx message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1304, the router processor may generate a common surrogate key based on the subscriber identifiers included in the first communication message. In block 1306, the router processor may query a data locality table and use the common surrogate key to retrieve information suitable for use in identifying a first logical scalable unit that includes a first database component that stores subscriber data that relates to the identified subscriber. Alternatively, in block 1306, the router processor may use the common surrogate key to retrieve information suitable for use in identifying a first application component that is closely coupled to the first database component.

In block 1308, the router processor may send the first communication message to a first application processor in the multiprocessor computing system that includes or is closely coupled to the first logical scalable unit, the first application component, and/or the first database component.

In block 1310, the first application processor may receive the first communication message in the first application component, retrieve subscriber data from the first database component, process the first communication message using the subscriber data, generate a second communication message, and send the second communication message to the router processor. In block 1312, the router processor may receive the second communication message and route the second communication message to another component or sub-system in the telecommunication network.

In block 1314, the router processor may receive communication messages that include information suitable for updating one or more data locality tables of one or more router components. In an embodiment, the router processor may receive the communication messages in response to subscriber data being moved between database components or partitions and/or in response to the telecommunication system being scaled. In various embodiments, the router processor may receive these communication messages from the first database component, the multiprocessor computing system, or the first logical scalable unit.

In block 1316, the router processor may receive a third communication message (e.g., Rx Message) for the same subscriber, but which includes a different subscriber/session identifier and/or a subset of the previously received identifiers (e.g., FIA+APN, etc.). In block 1318, the router processor may identify the common surrogate key using the subscriber identifier included in the third communication message.

In block 1320, the router processor may query a data locality table, and use the common surrogate key to retrieve information that identifies a second database component as storing the subscriber data previously stored in the first database component. Alternatively, in block 320, the router processor may use the common surrogate key to retrieve information suitable for use in identifying a second logical scalable unit that includes the second database component, or which is suitable for use in identifying a second application component that is closely coupled to the second database component.

In block 1322, the router processor may send the third communication message to a second application processor in the multiprocessor computing system that includes or is closely coupled to the second logical scalable unit, the second application component, and/or the second database component.

Figure 14:
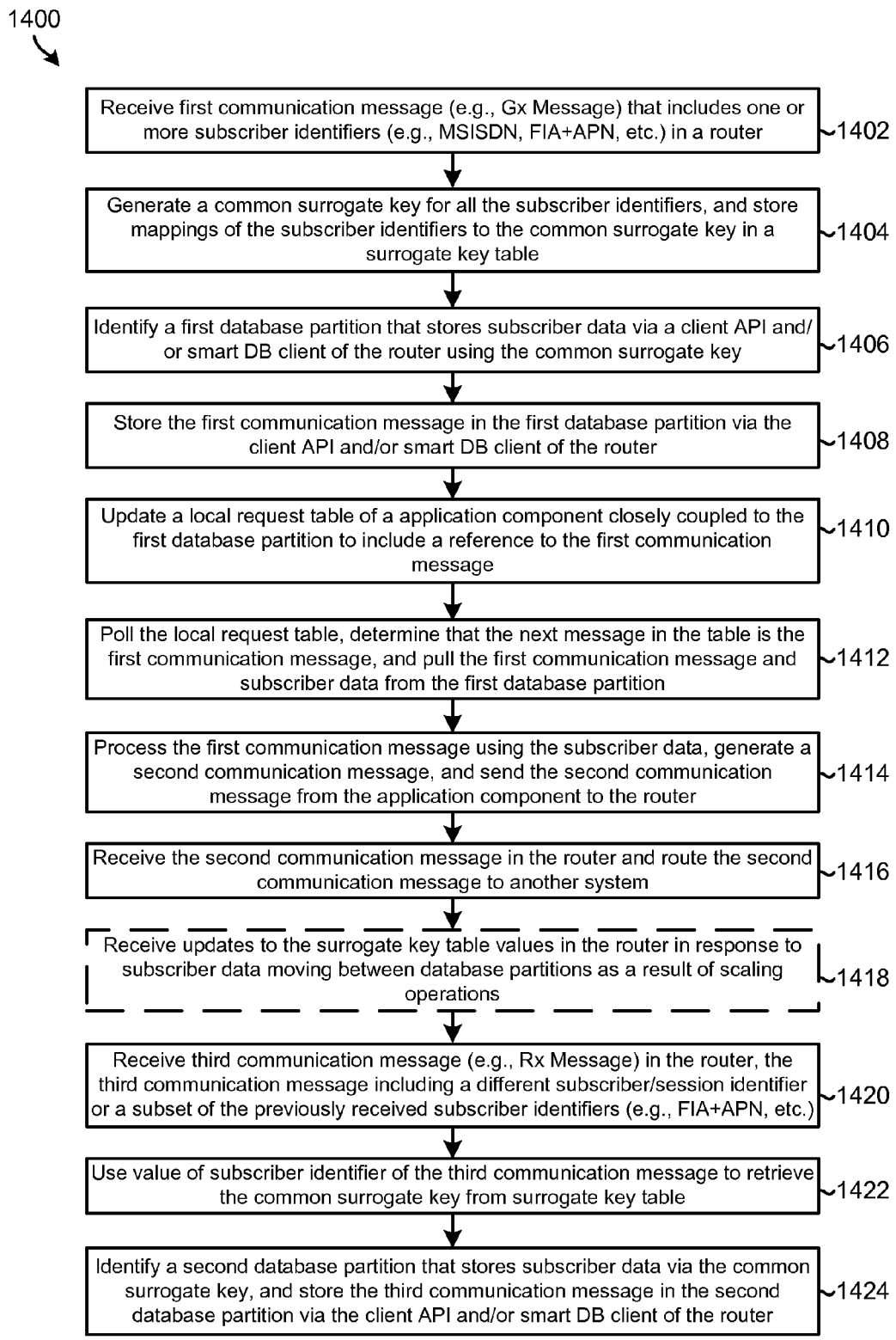
FIG. 14 is a process flow chart illustrating an embodiment common key routing and database proxy architecture (CKR-DPA) method of processing communication messages.

FIG. 14 illustrates an embodiment CKR-DPA method 1400 of processing a request message. The CKR-DPA method 1400 may be performed by various components (e.g., server computing devices, processors, processes, etc.) in a high-speed, highly available, elastically scalable telecommunication system 800.

In block 1402, a router processor in a multiprocessor computing system may receive a first communication message (e.g., Gx Message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1404, the router processor may generate a common surrogate key for all the subscriber identifiers included in the first communication message, and store mappings of the subscriber identifiers to the common surrogate key in a surrogate key table. In an embodiment, the router processor may store the surrogate key in a local memory coupled to the router processor.

In block 1406, the router processor may use the common surrogate key to retrieve information that identifies a first database component/memory as storing subscriber data associated with the identified subscriber. In an embodiment, this may be accomplished via a client API and/or smart DB client. In various embodiments, identifying the first database component may include, or may be accomplished by, identifying a first logical scaling unit and/or a first application component that is closely coupled to the first database component. In an embodiment, the first database component may be closely coupled to a first application processor. In an embodiment, the first application processor may also be closely coupled to the first logical scaling unit and/or a first application component.

In block 1408, the router processor may store the first communication message in the first database component. In an embodiment, this may be accomplished via a client API and/or smart DB client. In an embodiment, in block 1408, the router processor may use the client API to store the first communication message in a memory that is closely coupled to the first application processor, the first logical scaling unit, a first application component, and/or the first database component.

In block 1410, the first application processor may update a request table stored in a local memory coupled to the first application component. For example, the memory may be in the same datacenter, rack, computing device, chip, or core as the processor executing the first application component (e.g., the first application processor). In embodiment, the first application processor may update the request table to store, or include a reference to, the first communication message.

In block 1412, the first application processor may poll the local request table and pull the first communication message and subscriber data stored in the first database partition or memory. In block 1414, the first application processor may process the first communication message using the subscriber data, generate a second communication message, and send the second communication message to the router processor.

In block 1416, the router processor may receive the second communication message and route the second communication message to another system or component in the telecommunication network.

In optional block 1418, the router processor may receive communication messages that include information suitable for updating the surrogate key table values. In an embodiment, the router processor may receive the communication messages in response to subscriber data being moved between database components/partitions/memories and/or in response to the telecommunication system being scaled. In various embodiments, the router processor may receive these communication messages from the first database component, the multiprocessor computing system, or the first logical scalable unit.

In block 1420, the router processor may receive a third communication message (e.g., Rx Message) for the same subscriber that includes a different subscriber/session identifiers or a subset of the previously received identifiers (e.g., FIA+APN, etc.). In block 1422, the router processor may use value of subscriber identifier of the third communication message to retrieve the common surrogate key from surrogate key table.

In block 1424, the router processor may identify a second database component/memory that stores subscriber data for the subscriber via the common surrogate key, and store the third communication message in the second database component via the client API and/or smart DB client. In an embodiment, the second database component may be included in the same component (e.g., server computing device) or logical scalable unit as the router processor. In another embodiment, the second database partition may be included in a different component or logical scalable unit as the router processor.

Figure 15A:
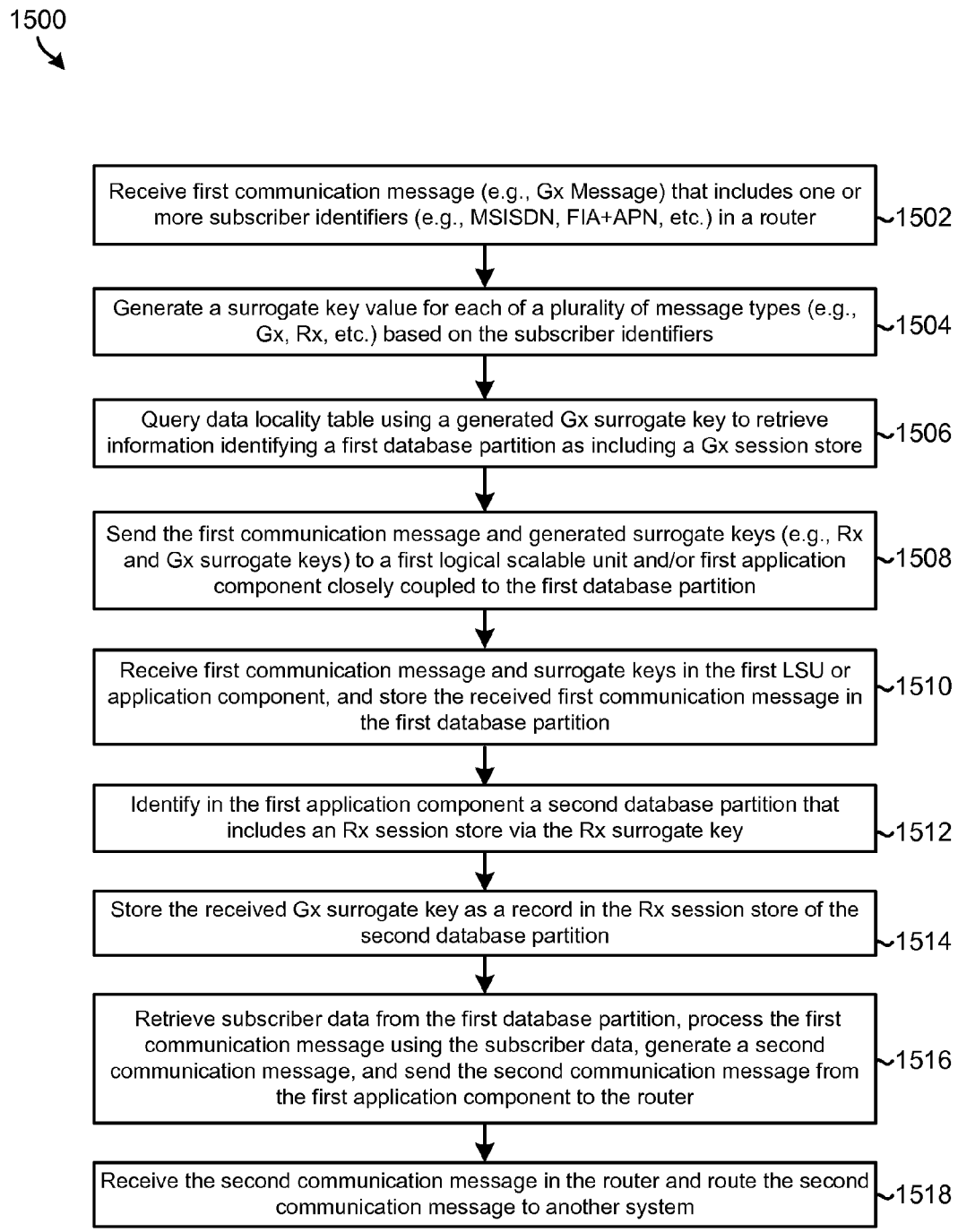
FIGS. 15A and 15B are process flow charts illustrating an embodiment independent key routing and data locality table (IKR-DLT) method of processing a request message.
Figure 15B:
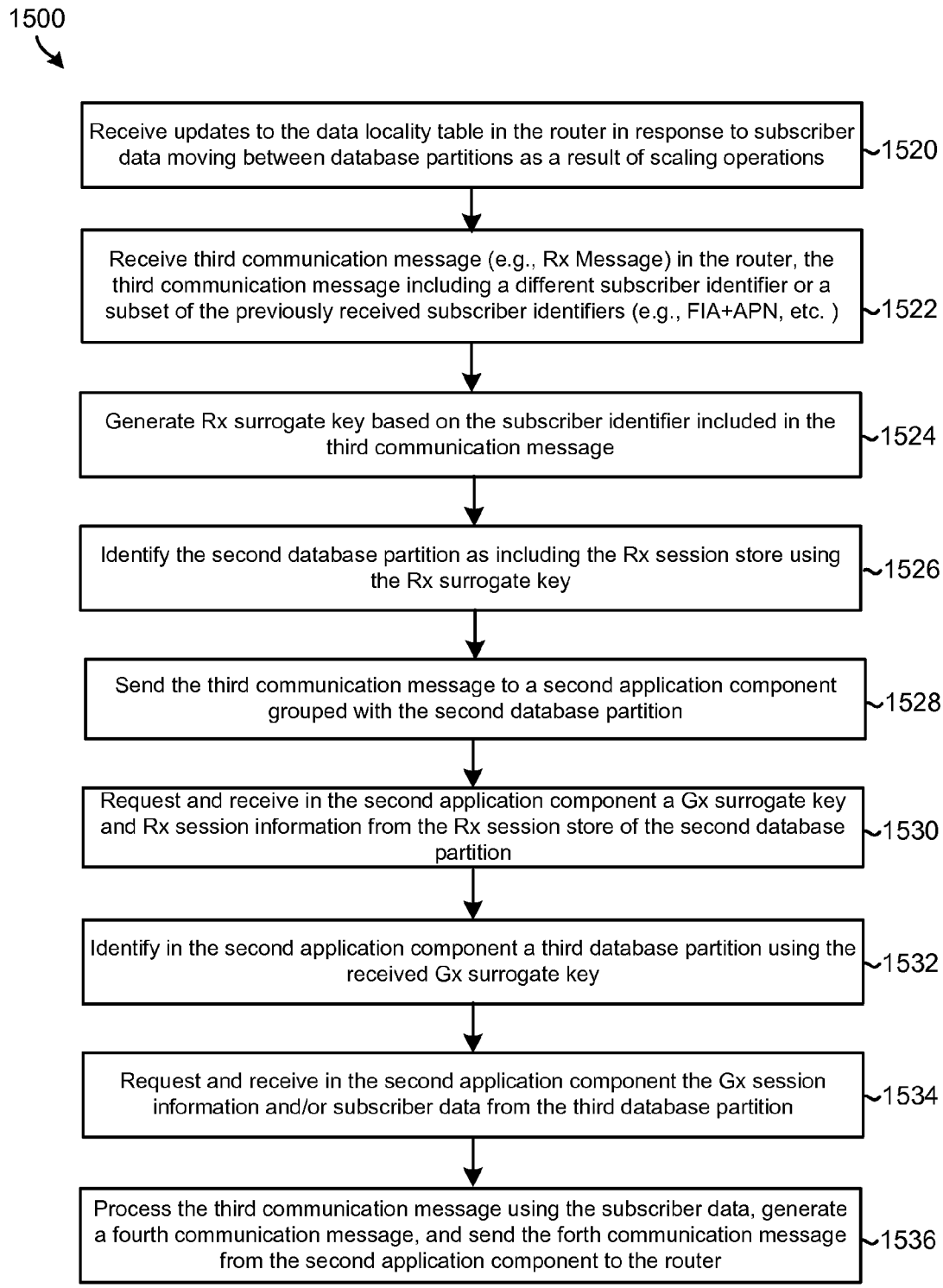

FIGS. 15A and 15B illustrate an embodiment IKR-DLT method 1500 of processing a request message. The IKR-DLT method 1500 may be performed by various components (e.g., server computing devices, processors, processes, etc.) in a high-speed, highly available, elastically scalable telecommunication system 800.

In block 1502 of FIG. 15A, a router processor in a multiprocessor computing system may receive a first communication message (e.g., Gx Message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1504, the router processor may generate a surrogate key value for each of a plurality of message types (e.g., Gx, Rx, etc.) based on the subscriber identifiers included in the first communication message.

In block 1506, the router processor may query a data locality table using a generated first surrogate key (e.g., SKGx) to retrieve information suitable for use in identifying a first logical scalable unit that includes a first database component that includes a first session store (e.g., a Gx session store) and/or stores subscriber data that relates to the identified subscriber. Alternatively, in block 1506, the router processor may use the generated first surrogate key (SKGx) to retrieve information suitable for use in identifying a first application component that is closely coupled to the first database component.

In block 1508, the router processor may send the first communication message and generated surrogate keys (e.g., Rx and Gx surrogate keys) to a first application processor in the multiprocessor computing system that includes or is closely coupled to a first application component, the first logical scalable unit, and/or the first database component.

In block 1510, the first application processor may receive the first communication message and surrogate keys (e.g., Rx and Gx surrogate keys) in the first application component and store the received first communication message in the first database component/partition/memory.

In block 1512, the first application processor may identify a second database component that includes a second session store (e.g., Rx session store) that stores information for a different message type than that which is stored in the first session store. For example, the first application processor may use the Rx surrogate key (SKRx) received from the router processor to determine that the second database components includes an Rx session store that stores Rx information relating to the subscriber.

In block 1514, the first application processor may store the received first surrogate key (SKGx) as a record in the second session store/memory (e.g., Rx session store) of the second database component. In various embodiments, the router processor may store the first surrogate key in the second session store using a local or non-remote or asynchronous communication.

In block 1516, the first application processor may retrieve subscriber data from the first database component, process the first communication message using the subscriber data, generate a second communication message, and send the second communication message the router processor. In block 1518, the router processor may receive the second communication message in the router and route the second communication message to another system In block 1520 of FIG. 15B, the router processor may receive communication messages that include information suitable for updating one or more data locality tables of one or more router components. In an embodiment, the router processor may receive the communication messages in response to subscriber data being moved between database components or partitions and/or in response to the telecommunication system being scaled. In various embodiments, the router processor may receive these communication messages from the first database component, the multiprocessor computing system, or the first logical scalable unit.

In block 1522, the router processor may receive a third communication message (e.g., Rx Message) for the same subscriber that includes a different subscriber identifier or a subset of the previously received subscriber identifiers (e.g., FIA+APN, etc.). In block 1524, the router processor may generate or identify the second surrogate key (e.g., SKRx) based on the subscriber identifier included in the third communication message.

In block 1526, the router processor may use the generated second surrogate key (e.g., SKRx) to determine that the second database component includes the second session store/memory (e.g., Rx session store), and that the second session store/memory includes information related to the subscriber identified in the third communication message. Also in block, 1526, the router processor may use the generated second surrogate key (e.g., SKRx) to retrieve information suitable for use in identifying a second application processor, a second logical scalable unit, and/or a second application component that is closely coupled to the second database component.

In block 1528, the router processor may send the third communication message and the generated second surrogate key (e.g., SKRx) to the second application processor, second logical scalable unit, and/or second application component.

In block 1530, the second application processor may retrieve the first surrogate key (e.g., SKGx) and session information (e.g., Rx session information) from the second session store/memory (e.g., Rx session store) in the second database component/memory, and make this information available for use by the second application component.

In block 1532, the second application processor and/or second application component may use the retrieved first surrogate key (SKGx) to determine that the first session store/memory (e.g., Gx session store) is now located in the third database component. In an embodiment, the third database component may be closely coupled to a third application processor in the multiprocessor system and/or to a third logical scalable unit.

In block 1534, the second application processor may retrieve session information (e.g., Gx session information) and/or subscriber data from the first session store/memory (e.g., Gx session store) in the third database component/memory and make this information available to the second application. In block 1536, the second application processor may process the third communication message using the subscriber data, generate a fourth communication message, and send the forth communication message to the router processor.

Figure 16A:
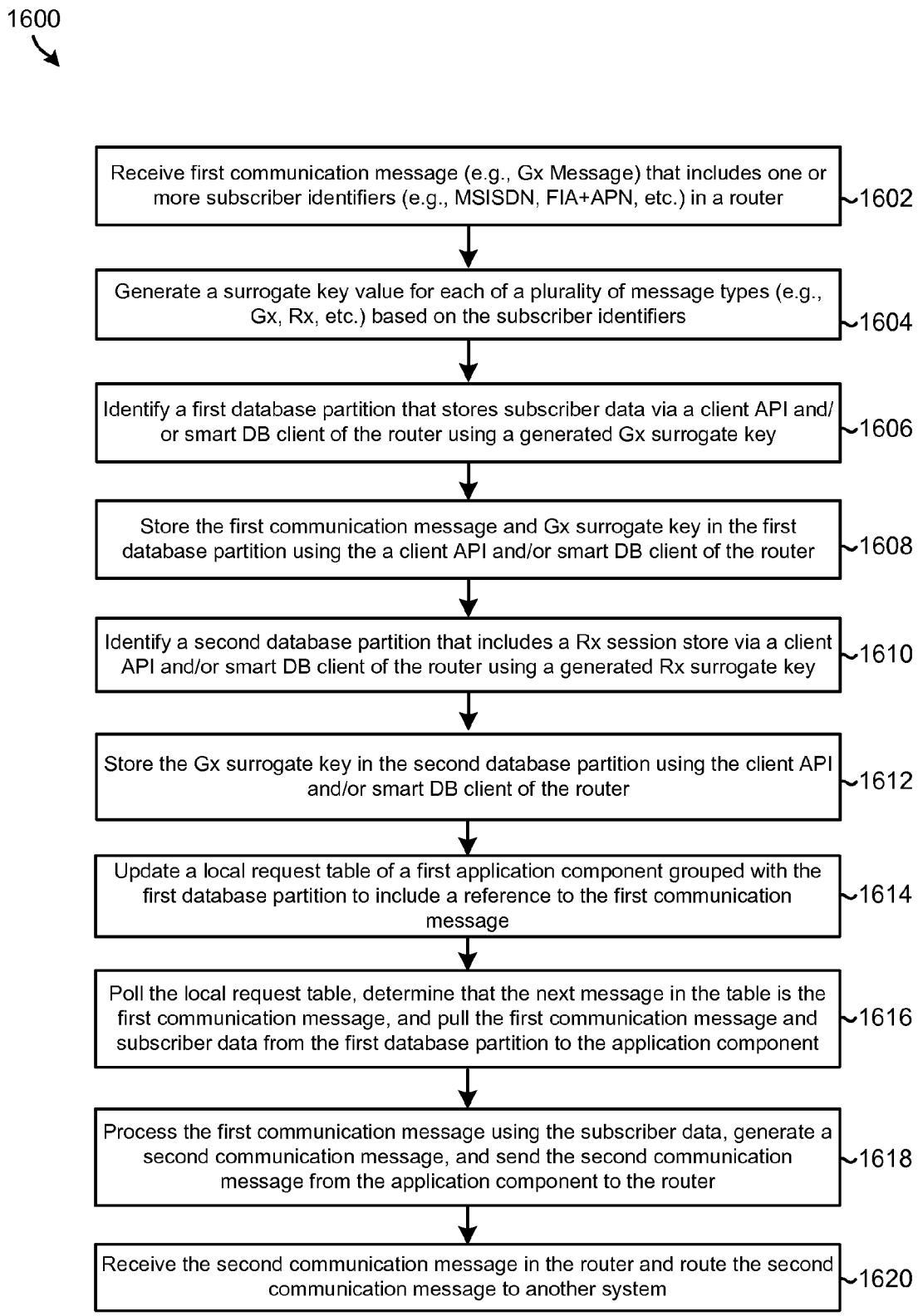
FIGS. 16A and 16B are process flow charts illustrating an embodiment independent key routing and database proxy architecture (IKR-DPA) method of processing a request message.
Figure 16B:
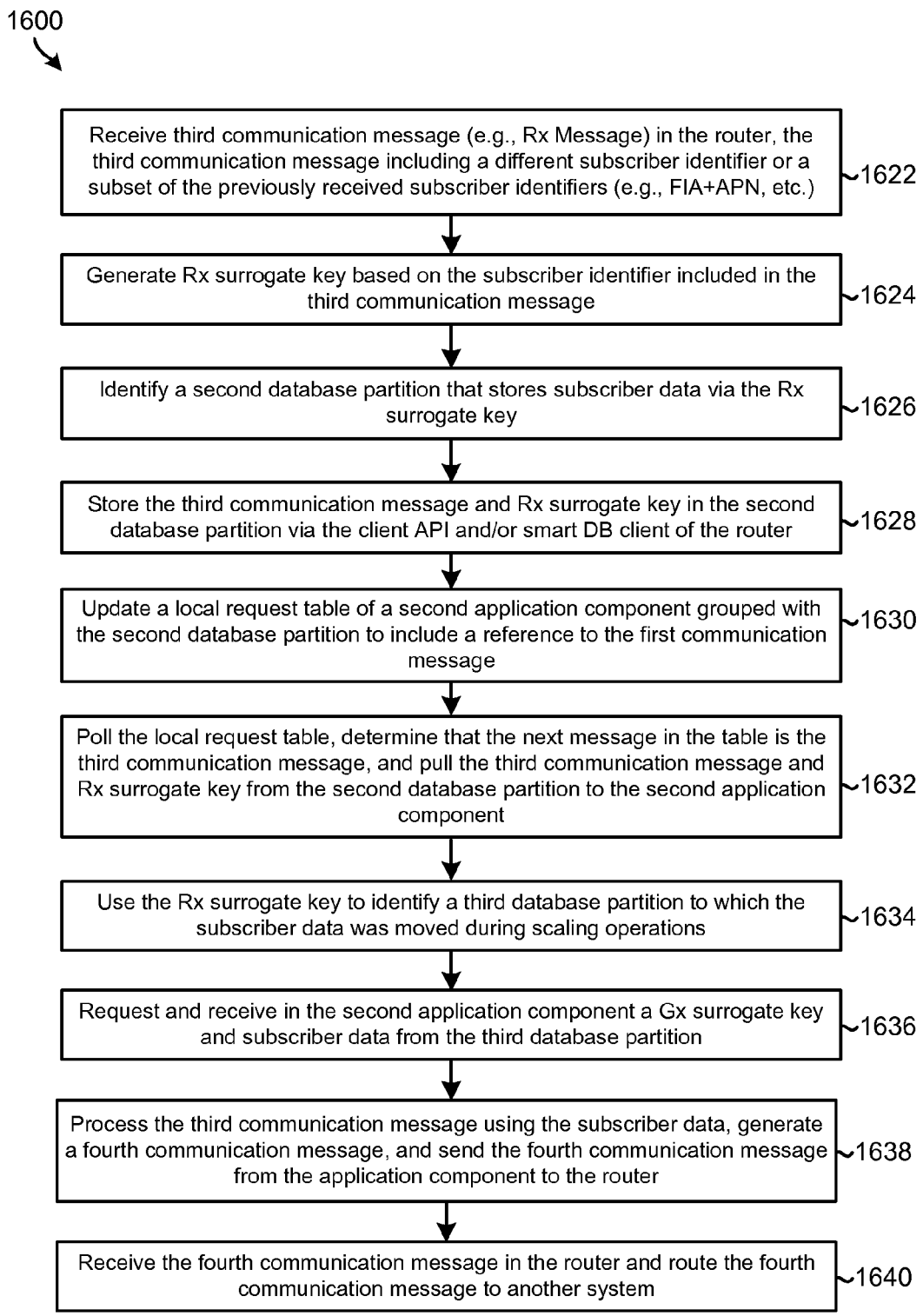

FIGS. 16A and 16B illustrate an embodiment IKR-DPA method 1600 of processing a request message. The IKR-DPA method 1600 may be performed by various components (e.g., server computing devices, processors, processes, etc.) in a high-speed, highly available, elastically scalable telecommunication system 800.

In block 1602, a router processor in a multiprocessor computing system may receive a first communication message (e.g., Gx Message) that includes subscriber identifiers (e.g., MSISDN, FIA+APN, etc.) that uniquely identify a subscriber. In various embodiments, the multiprocessor computing system may be a multicore processor, a system on a chip, a multi-processor server computing device, a server blade, a server rack, a datacenter, a cloud computing system, a distributed computing system, etc.

In block 1604, the router processor may generate a surrogate key value for each of a plurality of message types (e.g., Gx, Rx, etc.) based on the subscriber identifiers included in the first communication message.

In block 1606, the router processor may use a generated first surrogate key (e.g., SKGx) to identify a first database component that stores subscriber data. In an embodiment, this may be accomplished via a client API and/or smart DB client. In an embodiment, identifying the first database component may include, or may be accomplished by, identifying a first logical scalable unit and/or first application component that are closely coupled to the first database component.

In block 1608, the router processor may store the first communication message and generated first surrogate key (e.g., SKGx) in the first database component. In an embodiment, this may be accomplished via the client API and/or smart DB client. In an embodiment, in block 1608, the router processor may use the client API to store the first communication message and generated first surrogate key (e.g., SKGx) in a memory that is closely coupled to a first application processor in the multiprocessor computing system, the first logical scalable unit, the first application component, and/or the first database component.

In block 1610, the router processor may use a generated second surrogate key (e.g., SKRx) to identify a second database component that includes a second session store (e.g., Rx session store) that is associated with the subscriber identified in the first communication message and which stores information for a different message type (e.g., Rx message type) than that which is stored in the first session store. In an embodiment, this may be accomplished via the client API and/or smart DB client.

In block 1612, the router processor may store the first surrogate key (e.g., SKGx) in the second database component, which may also be accomplished via the client API and/or smart DB client. In an embodiment, in block 1608, the router processor may use the client API to store the first surrogate key (e.g., SKGx) in a memory that is closely coupled to a second application processor in the multiprocessor system, a logical scalable unit, a second application component, and/or the second database component.

In block 1614, the first application processor may update a request table stored in a local memory of the first application to include a reference to the first communication message. In various embodiments, the local memory may be in the same datacenter, rack, computing device, chip, or core as the first application processor.

In block 1616, the first application processor may poll the local request table and determine that the next message in the request table is the first communication message. Also in block 1616, the first application processor may pull the first communication message and subscriber data stored in the first database component or memory in response to determining that the next message in the table is the first communication message. In block 1618, the first application processor may process the first communication message using the subscriber data, generate a second communication message, and send the second communication message to the router processor. In block 1620, the router processor may receive the second communication message and route the second communication message to another system or component in the telecommunication network.

In block 1622, the router processor may receive a third communication message (e.g., Rx Message) for the same subscriber that includes a different subscriber identifier or a subset of the previously received subscriber identifiers (e.g., FIA+APN, etc.). In block 1624, the router processor may identify or generate the second surrogate key (SKRx) based on the subscriber identifier included in the third communication message.

In block 1626, the router processor may use the second surrogate key (SKRx) to determine that a second database component stores subscriber data for the subscriber identified in the third communication message. In block 1628, the router processor may store the third communication message and second surrogate key (SKRx) in the second database component. In an embodiment, this may be accomplished via the client API and/or smart DB client. The second database component may be closely coupled to a second application processor of the multiprocessor computing system, a second logical scalable unit, and/or a second application component.

In block 1630, the second application processor may update a request table stored in a memory that is closely coupled to the second application component to include a reference to the third communication message.

In block 1632, the second application processor may poll the local request table, determine that the next message in the table is the third communication message, and pull the third communication message and second surrogate key (SKRx) from the second database component/memory and make this information available to the second application.

In block 1634, the second application processor may use the second surrogate key (SKRx) to identify a third database component to which the subscriber data was moved during scaling operations. In an embodiment, the third database component may be closely coupled to a third application processor, a third logical scalable unit, and/or a third application component.

In block 1636, the second application processor may receive a first surrogate key (e.g., SKGx) and subscriber data from the third database component and make this information available to the second application component. In block 1638, the second application processor may process the third communication message using the subscriber data, generate a fourth communication message, and send the fourth communication message from the application to the router processor. In block 1640, the router processor may receive the fourth communication message in the router and route the fourth communication message to another system in the telecommunication network.

Figure 17:
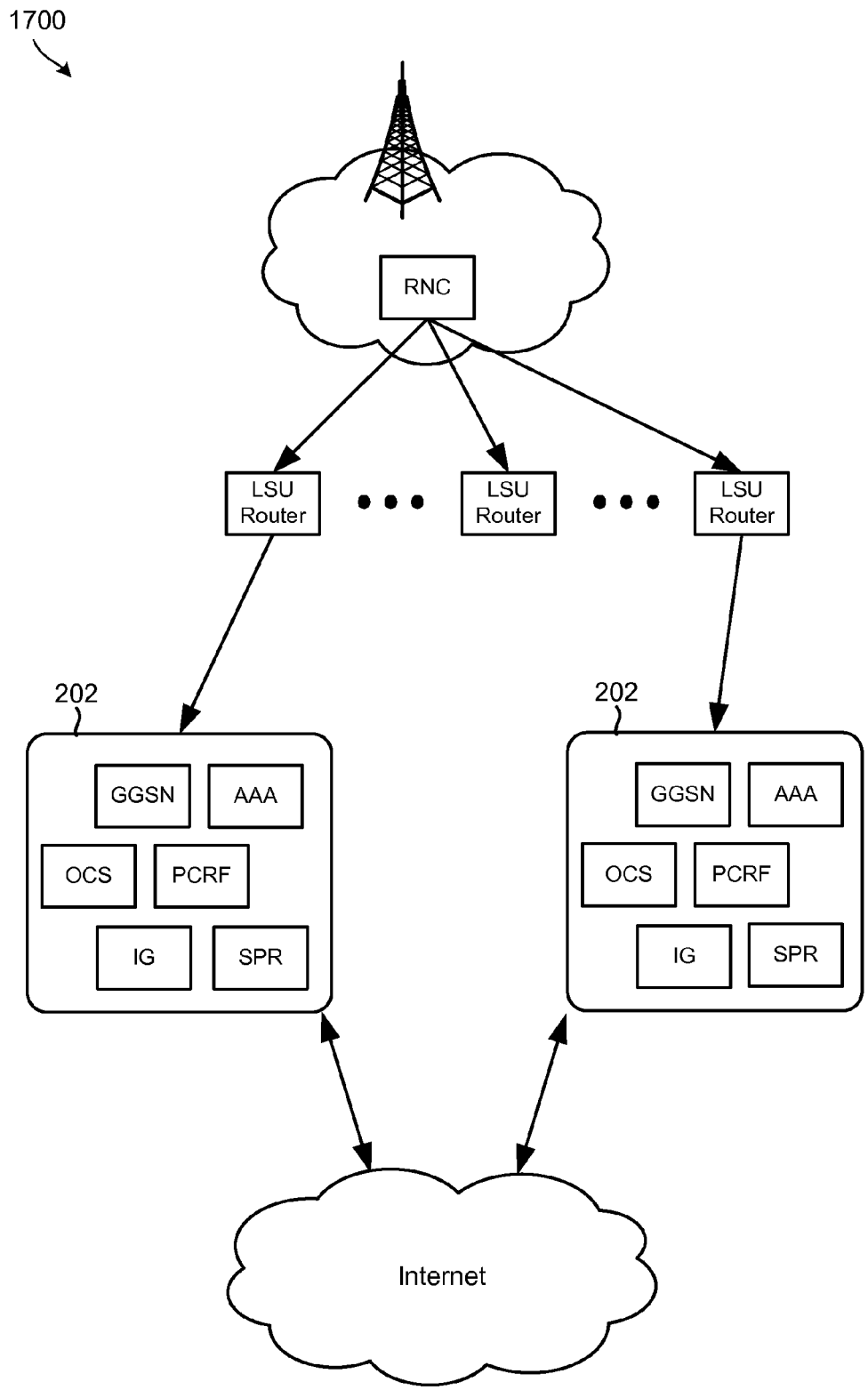
FIG. 17 is a block diagram illustrating an embodiment subscriber data-centric system that includes components configured achieve improved data locality.

FIG. 17 illustrates an embodiment subscriber data-centric system 1700 that includes components configured achieve improved data locality. The system may include a plurality of logical scalable units 202, each of which includes all the data and processing logic and resources for a limited number of users or subscribers. In an embodiment, the system 1700 may include a logical scalable unit 202 for each subscriber. In this embodiment, there may be many instances of each functional node (e.g., GGSN, PCRF, etc.), but each instance is used for a very limited number of subscribers.

The logical scalable units 202 may include both control plane components (OCS, PCRF, etc.) and data plane components (GGSN, deep packet inspector, etc.). Since the logical scalable units 202 are self contained, all of the control plane traffic for a subscriber may be kept within a single logical scalable unit 202. In this manner, the subscriber data-centric system 1700 may reduce network traffic and latencies, and improve the system's scalability and elasticity.

Figure 18:
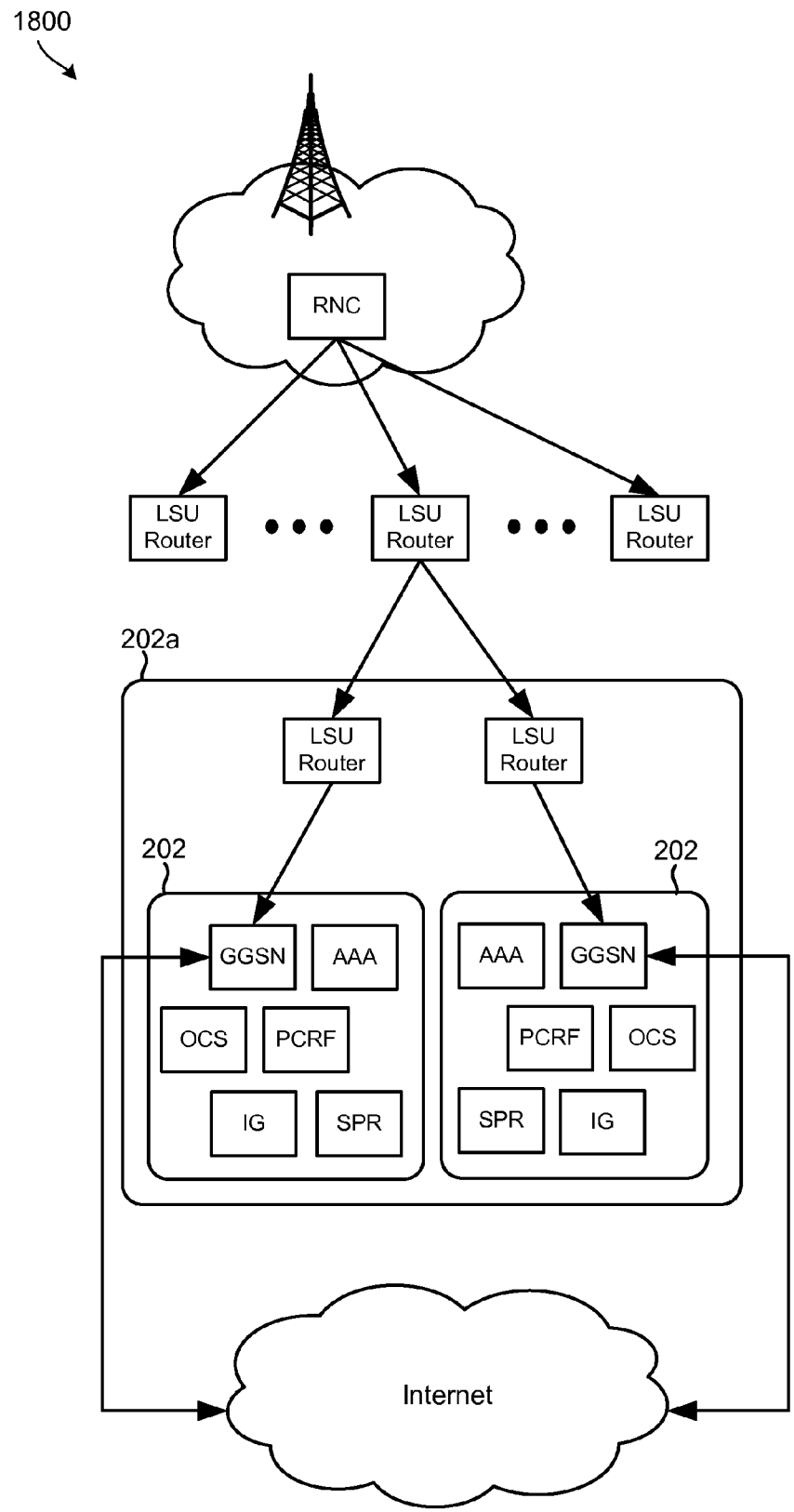
FIG. 18 is a block diagram illustrating an embodiment system that includes a plurality of logical scalable units organized into a hierarchy.

FIG. 18 illustrates an embodiment system 1800 in which logical scalable units 202 are organized in a hierarchical manner. In the example illustrated in FIG. 18, the system 1800 includes a parent logical scalable unit 202a that includes a plurality of child logical scalable units 202. The parent logical scalable unit 202a may be included in a single server blade having multiple multiprocessor server computing devices, and each of the child logical scalable units 202 may be included in one or more of the server computing devices. For example, a child logical scalable unit 202 may include multiple processors in a single server in the server blade.

Figure 19:
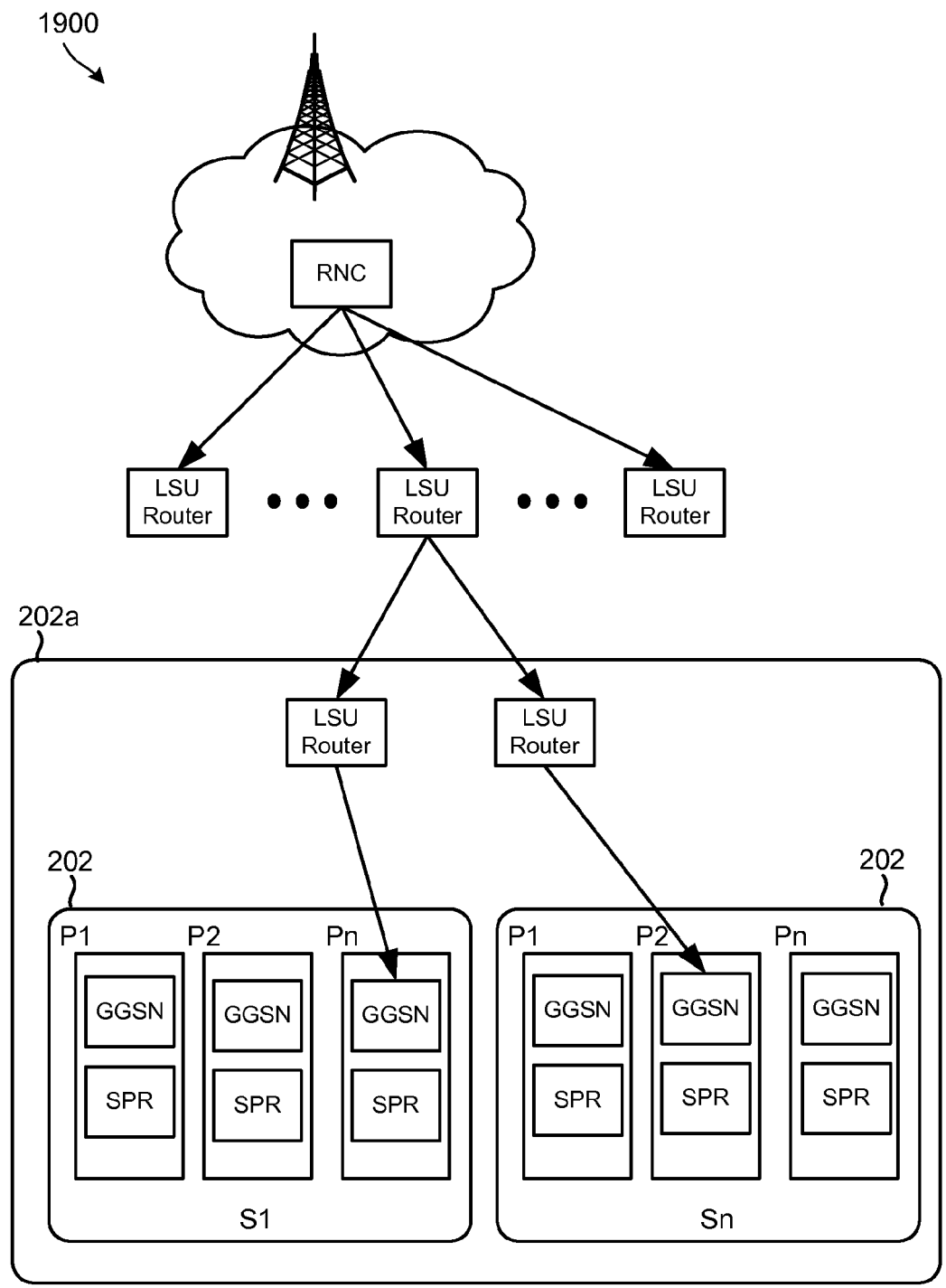
FIG. 19 is a block diagram illustrating another embodiment system that includes a plurality of logical scalable units organized into a hierarchy.

FIG. 19 illustrates another embodiment system 1900 in which logical scalable units 202 are organized in a hierarchical manner. In the example illustrated in FIG. 19, the system 1900 includes a parent logical scalable unit 202a that includes a plurality of child logical scalable units (S1, S2) 202. The parent logical scalable unit 202a may be included in a single server blade having multiple multiprocessor server computing devices, and each of the child logical scalable units (S1, S2) 202 may be included in a multiprocessor server computing device. Further, each of the child logical scalable units (S1, S2) 202 may include a plurality of other logical scalable units (P1, P2, Pn) that are each included in a single processor of the multiprocessor server computing device. Each of these other logical scalable units (P1, P2, Pn) may be associated with a single subscriber, and thus the system may process subscriber requests without the use of threads or locks. This improves the speed and efficiency of the system 1900.

Figure 20:
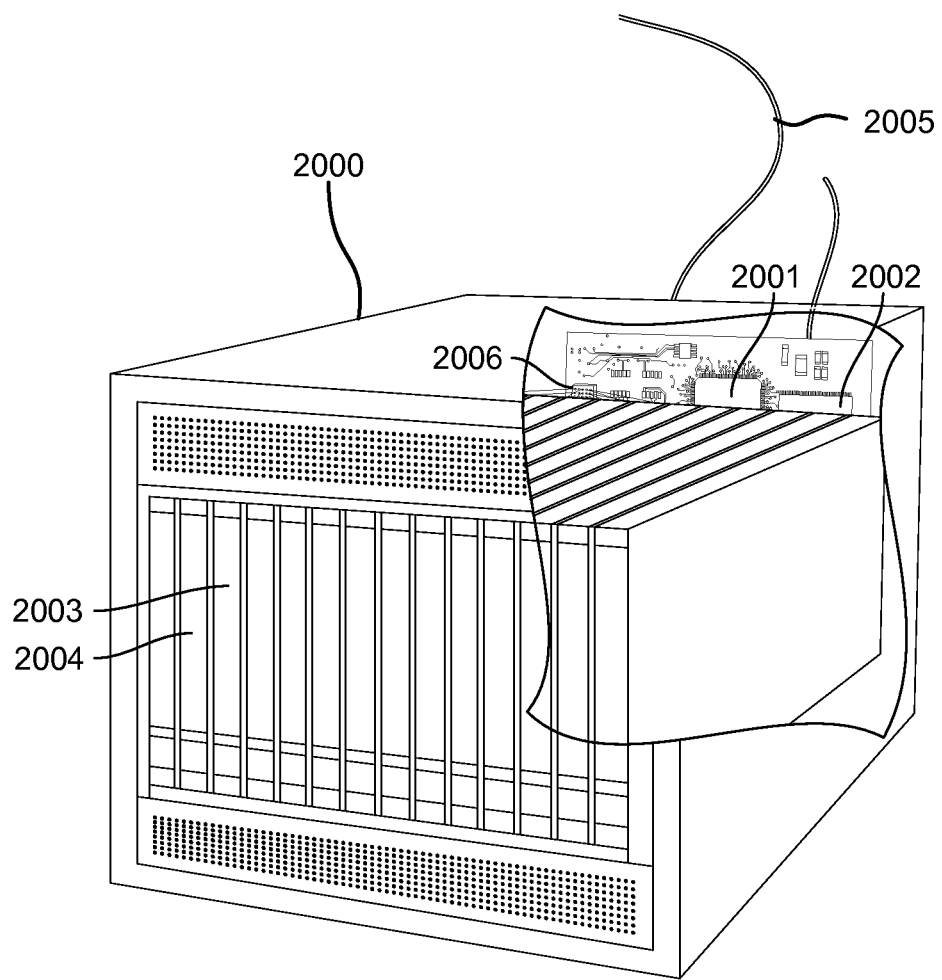
FIG. 20 is a system block diagram of a server suitable for implementing various embodiments.

The various embodiments may be implemented on any of a variety of commercially available server devices, such as the server 2000 illustrated in FIG. 20. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive 2004 coupled to the processor 2001. The server 2000 may also include network access ports 2006 coupled to the processor 2001 for establishing data connections with a network 2005, such as a local area network coupled to other operator network computers and servers.

The processor 2001 may be any programmable microprocessor, microcomputer or multiple processor chip or chips that can be configured by software instructions (applications) to perform a variety of functions, including the functions of the various embodiments described below. Multiple processors 2001 may be provided, such as one processor dedicated to wireless communication functions and one processor dedicated to running other applications. Typically, software applications may be stored in the internal memory 2002, 2003 before they are accessed and loaded into the processor 2001. The processor 2001 may include internal memory sufficient to store the application software instructions.

The foregoing method descriptions and the process flow diagrams are provided merely as illustrative examples and are not intended to require or imply that the blocks of the various aspects must be performed in the order presented. As will be appreciated by one of skill in the art the order of steps in the foregoing aspects may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module, which may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of routing communication messages in an elastically scalable telecommunication network, comprising:
   receiving a first communication message in a processor of a multiprocessor computing system from a component in the elastically scalable telecommunication network, the received first communication message including subscriber identifiers that uniquely identify a subscriber;
   generating in the processor a plurality of keys for a plurality of message types based on the subscriber identifiers included in the received first communication message;
   identifying in the processor a first logical scalable unit that includes a first database memory that stores a first type of data relating to the subscriber by using a first key of the generated plurality of keys to query a data locality table;
   identifying a first application processor in the multiprocessor computing system that is part of the identified first logical scalable unit; and
   sending the received first communication message and the generated plurality of keys from the processor to the identified first application processor.

2. The method of claim 1, wherein sending the received first communication message from the processor to the first application processor comprises sending the received first communication message to a first application component in the first application processor.

3. The method of claim 1, further comprising:
   receiving the first communication message and the plurality of keys in the first application processor;
   identifying in the first application processor a second logical scalable unit that includes a second database memory that stores a second type of data relating to the subscriber via a second key of the plurality of keys;
   storing the first key in the second database memory;
   retrieving subscriber data from the first database memory;
   performing application-level operations using the subscriber data retrieved from the first database memory and the first communication message;
   generating a second communication message based on the subscriber data retrieved from the first database memory; and
   sending the second communication message from the first application processor to the processor.

4. The method of claim 3, further comprising:
   receiving the second communication message in the processor; and
   routing the second communication message to another component or sub-system in the elastically scalable telecommunication network.

5. The method of claim 1, further comprising:
   receiving in the processor information identifying that the first type of data relating to the subscriber is now stored in a third database memory as a result of scaling operations in the elastically scalable telecommunication network; and
   updating at least one data locality table in response to receiving the information identifying the third database memory as storing the first type of data.

6. The method of claim 1, further comprising:
   receiving in the processor a third communication message;
   identifying a second key in the plurality of keys for the third communication message based on information included in the third communication message;
   determining whether a second logical scalable unit includes a second database memory that stores a second type of data by using the second key to query the data locality table;
   identifying a second application processor in the multiprocessor computing system that is part of the second logical scalable unit; and
   sending the third communication message from the processor to the second application processor.

7. The method of claim 6, further comprising:
   receiving the third communication message in the second application processor;
   retrieving the first key from the second database memory;
   identifying a third logical scalable unit that includes a third database memory that stores the first type of data based on the first key;
   retrieving subscriber data from the third database memory;
   performing application-level operations using the subscriber data retrieved from the third database memory;
   generating a fourth communication message based on the subscriber data retrieved from the third database memory; and
   sending the fourth communication message from the second application processor to the processor.

8. The method of claim 6, wherein:
   receiving the first communication message in the processor comprises receiving a Gx communication message in the processor; and receiving the third communication message in the processor comprises receiving an Rx communication message in the processor.

9. A computing device deployed in an elastically scalable telecommunication network, comprising:
a processor configured with processor-executable instructions to perform operations comprising:
receiving a first communication message that includes subscriber identifiers that uniquely identify a subscriber from a component in the elastically scalable telecommunication network;
generating a plurality of keys for a plurality of message types based on the subscriber identifiers included in the received first communication message;
identifying a first logical scalable unit that includes a first database memory that stores a first type of data relating to the subscriber by using a first key of the generated plurality of keys to query a data locality table;
identifying a first application processor that is part of the identified first logical scalable unit;
sending the received first communication message and the generated plurality of keys to the identified first application processor;
receiving a second communication message from the first application processor in response to sending the received first communication message, and routing the second communication message to another component in the elastically scalable telecommunication network; and
receiving information identifying that the subscriber data relating to the subscriber is now stored in a second database memory as a result of scaling operations in the elastically scalable telecommunication network; and
updating at least one data locality table in response to receiving the information.

10. The computing device of claim 9, wherein the processor is configured with processor-executable instructions to perform operations further comprising:
receiving a third communication message;
identifying a second key in the plurality of keys for the third communication message based on information included in the third communication message;
determining whether a second logical scalable unit includes a second database memory that stores a second type of data by using the second key to query the data locality table;
identifying a second application processor that is part of the second logical scalable unit; and
sending the third communication message to the second application processor.

11. The computing device of claim 10, wherein the processor is configured with processor-executable instructions to perform operations such that receiving the third communication message comprises:
receiving a communication message that includes a subset of the subscriber identifiers included in the first communication message.

12. The computing device of claim 10, wherein the processor is configured with processor-executable instructions to perform operations such that receiving the third communication message comprises:
receiving a communication message that identifies the subscriber using a different identifier than the subscriber identifiers included in the first communication message.

13. The computing device of claim 10, wherein the processor is configured with processor-executable instructions to perform operations such that:
receiving the first communication message comprises receiving a Gx communication message; and
receiving the third communication message comprises receiving an Rx communication message.

14. A non-transitory computer readable storage medium having stored thereon processor-executable software instructions configured to cause a processor of a computing device deployed in an elastically scalable telecommunication network to perform operations, the operations comprising:
receiving a first communication message that includes subscriber identifiers that uniquely identify a subscriber from a component in an elastically scalable telecommunication network;
generating a plurality of keys for a plurality of message types based on the subscriber identifiers included in the received first communication message;
identifying a first logical scalable unit that includes a first database memory that stores a first type of data relating to the subscriber by using a first key of the generated plurality of keys to query a data locality table;
identifying a first application processor that is part of the identified first logical scalable unit;
sending the received first communication message and the generated plurality of keys to the identified first application processor.

15. The non-transitory computer readable storage medium of claim 14, wherein the stored processor-executable software instructions are configured to cause a processor to perform operations comprising:
receiving a third communication message;
identifying a second key in the plurality of keys for the third communication message based on information included in the third communication message;
determining whether a second logical scalable unit includes a second database memory that stores a second type of data by using the second key to query the data locality table;
identifying a second application processor that is part of the second logical scalable unit; and
sending the third communication message to the second application processor.

16. The non-transitory computer readable storage medium of claim 15, wherein the stored processor-executable software instructions are configured to cause a processor to perform operations such that receiving the third communication message comprises:
receiving a communication message that includes a subset of the subscriber identifiers included in the first communication message.

17. The non-transitory computer readable storage medium of claim 15, wherein the stored processor-executable software instructions are configured to cause a processor to perform operations such that receiving the third communication message comprises:
receiving a communication message that identifies the subscriber using a different identifier than the subscriber identifiers included in the first communication message.

18. The non-transitory computer readable storage medium of claim 15, wherein the stored processor-executable software instructions are configured to cause a processor to perform operations such that:
receiving the first communication message comprises receiving a Gx communication message; and receiving the third communication message comprises receiving an Rx communication message.

* * * * *